United States Patent
Hu et al.

(10) Patent No.: US 10,073,715 B2
(45) Date of Patent: Sep. 11, 2018

(54) DYNAMIC RUNTIME TASK MANAGEMENT

(71) Applicant: Intel Corporation, Santa Clara, CA (US)

(72) Inventors: Chunling Hu, San Jose, CA (US); Tatiana Shpeisman, Menlo Park, CA (US); Rajkishore Barik, Santa Clara, CA (US); Justin E. Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 15/383,738

(22) Filed: Dec. 19, 2016

(65) Prior Publication Data
US 2018/0173563 A1  Jun. 21, 2018

(51) Int. Cl.
G06F 9/46 (2006.01)
G06F 9/48 (2006.01)
G06F 9/50 (2006.01)

(52) U.S. Cl.
CPC .......... G06F 9/4881 (2013.01); G06F 9/5027 (2013.01)

(58) Field of Classification Search
None
See application file for complete search history.

(56) References Cited

U.S. PATENT DOCUMENTS

2011/0209153 A1   8/2011  Suzuki et al.
2011/0292056 A1  12/2011  Haas et al.
2014/0351818 A1  11/2014  Katz et al.
2015/0067690 A1   3/2015  Maiti et al.
2015/0169305 A1   6/2015  State et al.

OTHER PUBLICATIONS

International Search Report and Written Opinion issued in PCT Application No. PCT/US2017/062395, dated Mar. 16, 2018, 9 pages.
Augonnet, Cédric, et al.: "StarPU: a unified platform for task scheduling on heterogeneous multicore architectures". S.T.-A. (2011). Concurrency and Computation: Practice & Experience-Euro-Par 2009 archive, 16 pages.
Tzenakis, George, et al.: "BDDT: Block-Level Dynamic Dependence Analysis for Task-Based Parallelism". A.P.(2013). Advanced Parallel Processing Technologies. Lecture Notes in Computer Science, 15 pages.

(Continued)

Primary Examiner — Gregory A Kessler
(74) Attorney, Agent, or Firm — Grossman, Tucker, Perreault & Pfleger, PLLC

(57) ABSTRACT

A dynamic runtime scheduling system includes task manager circuitry capable of detecting a correspondence in at least a portion of the output arguments from one or more first tasks with at least a portion of the input arguments to one or more second tasks. Upon detecting the output arguments from the first task represents a superset of the second task input arguments, the task manager circuitry apportions the first task into a plurality of new subtasks. At least one of the new subtasks includes output arguments having a 1:1 correspondence to the second task input arguments. Upon detecting the output arguments from an first task represents a subset of the second task input arguments, the task manager circuitry may autonomously apportion the second task into a plurality of new subtasks. At least one of the new subtasks may include input arguments having a 1:1 correspondence to first task output arguments.

24 Claims, 7 Drawing Sheets

(56) References Cited

OTHER PUBLICATIONS

Guo, Zhenhua, et al.: "AutomaticTask Re-organization in MapReduce". M.P.(2011). Cluster '11, Proceedings of the 2011 IEEE International Conference on Cluster Computing, 9 pages.

Heinecke, Alexander, et al.: "Design and Implementation of the Unpack Benchmark for Single and Multi-Node System Based on Intel Xeon Phi Architecture". (2013). IPDPS'13, Proceedings of the 2013 International Parallel and Distributed Processing Symposium, 12 pages.

DYNAMIC RUNTIME TASK MANAGEMENT

TECHNICAL FIELD

The present disclosure relates to task management and allocation in processor-based environments.

BACKGROUND

Heterogeneous systems make use of central processing units (CPUs) and accelerators, such as graphical processing units (GPUs), field programmable gate arrays (FPGAs). Heterogeneous systems may also make use of co-processors, such as the Xeon™ Phi manufactured by Intel, Corp. (Santa Clara, Calif.). Such heterogeneous systems are increasingly popular in the field of high-performance computing. Such accelerators may provide significant additional computing power and/or increased functionality to CPUs. However, developing software capable of leveraging the full power of such accelerators can be challenging for programmers. The challenges facing programmers include creating highly efficient code as well as specifying how tasks are partitioned between the CPU and one or more accelerators to optimize the use of system resources and maximize system performance.

Further complicating matters, the optimal partitioning of tasks among the central processing unit and one or more accelerators may depend on the properties of the task, and often the properties of the input data used by the task. In addition, data transmission between the central processing unit and the accelerators is usually significant in both quantity and time, thus consideration must also be given to reducing system latency by establishing workload partitions that maintain common data in a common device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
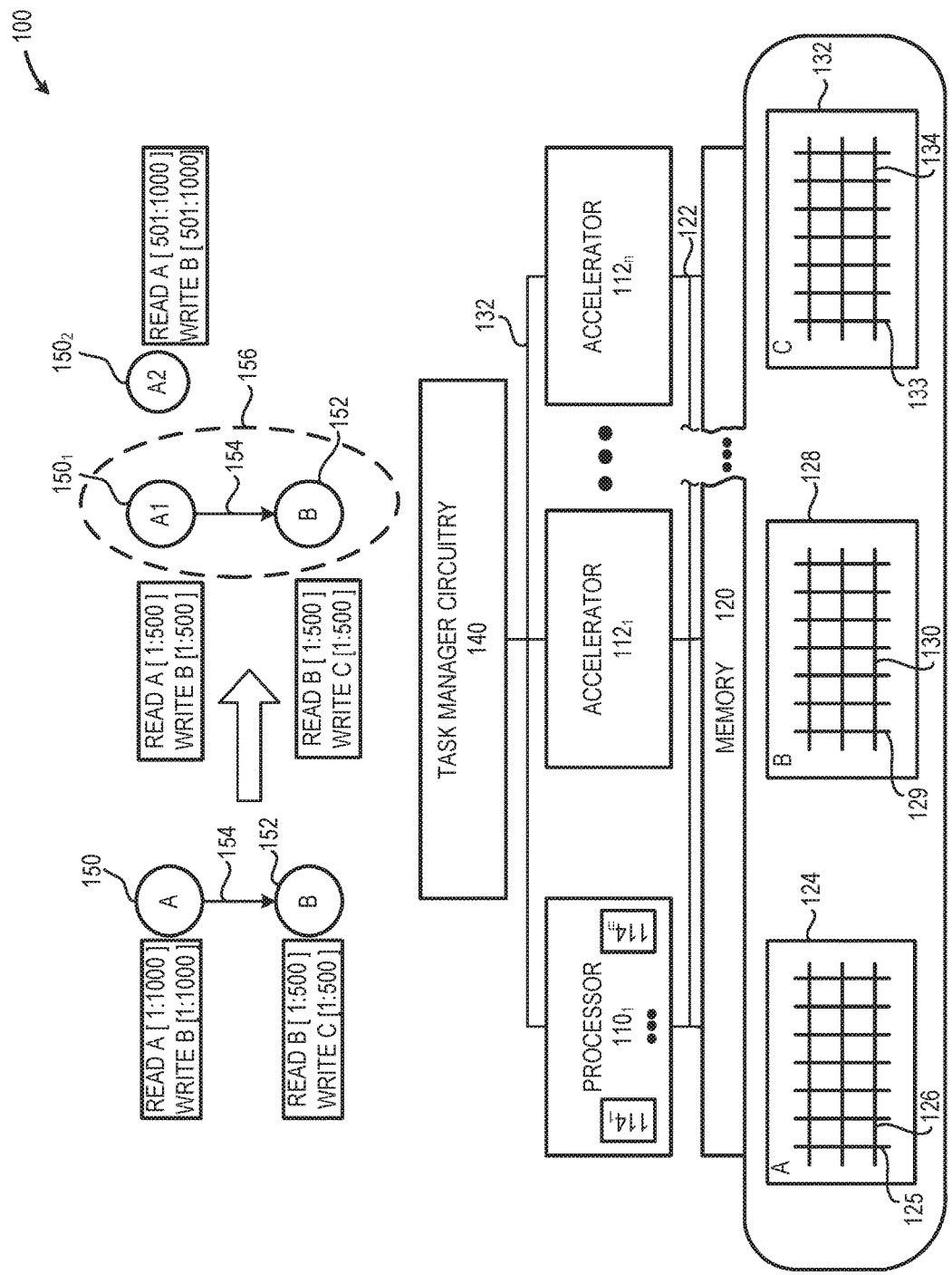
FIG. 1 is a schematic diagram depicting illustrative task manager circuitry providing a task management system in which tasks executed by a processor and at least one accelerator are autonomously apportioned among the processor/processor cores and the accelerators in a manner that maximizes task parallelism and minimizes run-time overhead, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

To manage the utilization of central processing units and accelerators, various automation methods have been proposed. One such method is through the use of dynamic scheduling runtimes. A dynamic scheduling runtime automates the process of partitioning a workload among one or more central processing units and a number of communicably coupled hardware accelerators. The workload is partitioned into tasks. A scheduler or task manager takes, as an input, a set of tasks and during program execution schedules those tasks to various system devices while maintaining dependencies between the tasks. Ideally, the scheduler or task manager discovers parallelism among tasks and schedules the tasks to optimize system performance and/or minimize system latency. In such an arrangement, programmers need not consider workload partitioning among system components.

In at least some implementations, dependencies between tasks may be maintained using a task graph or similar structure that depicts or otherwise denotes the relationship between tasks. A task graph is a directed graph that includes nodes representing tasks and directed edges that represent the relationships and data dependencies between various tasks. Data dependencies between tasks are determined by the scheduler or task manager at runtime and are processed when the scheduler or task manager inserts a task into the task graph. A task having no predecessors is ready for execution by a central processing unit and/or accelerator. Once executed, a completed task is removed from the task graph, enabling execution of additional tasks having a dependency on the recently completed task. If more than one task is ready for execution, the tasks may be scheduled simultaneously on different computing devices to achieve task-level parallelism.

The granularity of specific tasks may have a significant impact on the performance of the applied dynamic scheduling runtime. Task granularity may artificially limit parallelism and scheduling flexibility. If task granularity is too coarse tasks may be indivisible and may compromise the capability of the scheduler or task manager to effectively and/or efficiently partition and allocate subtasks between the central processing unit and one or more accelerators. On the other hand, if task granularity is set too fine, a large number of task nodes and dependency edges may be generated leading to higher overhead for the scheduler or task manager responsible for task allocation among the central processing unit and the accelerators. Rather than rely upon the programmer to select the appropriate level of granularity for an application, the systems and methods described herein instead automatically adjust task granularity in an attempt to maximize task parallelism while minimizing run-time overhead of task graph dependence analysis, scheduling, and maintenance.

A system that includes a plurality of communicably coupled processors is provided. The system may include a system memory communicably coupled to the plurality of communicably coupled processors; and task manager circuitry to dynamically allocate tasks among the plurality of communicably coupled processors, the task manager circuitry to:
compare a plurality of arguments associated with a new task with a plurality of arguments associated with at least one existing task; determine whether a 1:1 correspondence exists between at least some of the plurality of arguments associated with the new task and at least some of the plurality of arguments associated with the existing task; and responsive to determining at least some of a plurality of input arguments associated with the new task have a 1:1 correspondence with at least some of a plurality of output arguments associated with an existing task: apportion the existing task into a plurality of existing subtasks, such that each of the output arguments associated with a first existing subtask have a 1:1 correspondence with each of the input arguments associated with the new task.

According to example 1, there is provided a system that includes a plurality of communicably coupled processors; a system memory communicably coupled to the plurality of communicably coupled processors; and task manager circuitry to dynamically allocate tasks among the plurality of communicably coupled processors, the task manager circuitry to: compare a plurality of arguments associated with a new task with a plurality of arguments associated with at least one existing task; determine whether a 1:1 correspondence exists between at least some of the plurality of arguments associated with the new task and at least some of the plurality of arguments associated with the existing task; and responsive to determining at least some of a plurality of input arguments associated with the new task have a 1:1 correspondence with at least some of a plurality of output arguments associated with an existing task: apportion the existing task into a plurality of existing subtasks, such that each of the output arguments associated with a first existing subtask have a 1:1 correspondence with each of the input arguments associated with the new task.

A method of dynamically allocating tasks among a plurality of communicably coupled processors is provided. The method may include: comparing, by a task manager, a plurality of arguments associated with a new task with a plurality of arguments associated with at least one existing task; determining, by the task manager, whether a 1:1 correspondence exists between at least some of the plurality of arguments associated with the new task and at least some of the plurality of arguments associated with the existing task; and apportioning, by the task manager, the existing task into a plurality of existing subtasks, such that each of the output arguments associated with a first existing subtask have a 1:1 correspondence with each of the input arguments associated with the new task responsive to determining at least some of a plurality of input arguments associated with the new task have a 1:1 correspondence with at least some of a plurality of output arguments associated with an existing task.

A device including task manager circuitry that dynamically allocates tasks among the plurality of communicably coupled processors. The device may include task manager circuitry to: compare a plurality of arguments associated with a new task with a plurality of arguments associated with at least one existing task; determine whether a 1:1 correspondence exists between at least some of the plurality of arguments associated with the new task and at least some of the plurality of arguments associated with the existing task; responsive to determining at least some of a plurality of input arguments associated with the new task have a 1:1 correspondence with at least some of a plurality of output arguments associated with an existing task: apportion the existing task into a plurality of existing subtasks, such that each of the output arguments associated with a first existing subtask have a 1:1 correspondence with each of the input arguments associated with the new task; responsive to determining at least some of a plurality of output arguments associated with the new task have a 1:1 correspondence with at least some of a plurality of input arguments associated with an existing task: apportion the new task into a plurality of new subtasks, such that each of the output arguments associated with a first new subtask have a 1:1 correspondence with each of the input arguments associated with the existing task.

A non-transitory computer readable medium is provided. The non-transitory computer readable medium may include instructions, that when executed by a circuit, transform the circuit to dedicated task manager circuitry, the task manager circuitry to: compare a plurality of arguments associated with a new task with a plurality of arguments associated with at least one existing task; determine whether a 1:1 correspondence exists between at least some of the plurality of arguments associated with the new task and at least some of the plurality of arguments associated with the existing task; and apportion the existing task into a plurality of existing subtasks, such that each of the output arguments associated with a first existing subtask have a 1:1 correspondence with each of the input arguments associated with the new task responsive to determining at least some of a plurality of input arguments associated with the new task have a 1:1 correspondence with at least some of a plurality of output arguments associated with an existing task.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

FIG. 1 depicts an illustrative task management system 100 in which tasks executed by a processor 110 having at least one core $114_1$-$114_n$ (singly: "core 114" and collectively: "cores 114") and at least one accelerator $112_1$-$112_n$ (singly: "accelerator 112" and collectively: "accelerators 112") are automatically managed by task manager circuitry 140 such that tasks are apportioned among the processor 110 and the accelerators 112 in a manner that maximizes task parallelism and minimizes run-time overhead within the task manager circuitry 140, in accordance with at least one embodiment described herein. As one or more application(s) are executed by the processor 110 and/or the accelerators 112, the task manager circuitry 140 receives and allocates the various tasks associated with the application(s) among the processor 110 and the accelerators 112.

In operation, the task manager circuitry 140 compares the outputs each existing task with the inputs of those new tasks linked via a directed edge to the respective existing task to determine whether any of the existing task outputs are shared with any of the existing task inputs. In some implementations, all of the existing task outputs may have a 1:1 correspondence with at least a portion of the new task inputs—in such an instance, the task manager circuitry may divide, apportion, or otherwise separate the new task into a plurality of new subtasks. The inputs to at least one of the new subtasks included in the plurality of new subtasks may have a 1:1 correspondence to some or all of the existing task outputs. In some implementations, at least a portion of the existing task outputs may have a 1:1 correspondence with all of the new task inputs—in such an instance, the task manager circuitry may divide, apportion, or otherwise separate the existing task into a plurality of existing subtasks. The output from at least one of the existing subtasks included in the plurality of existing subtasks may have a 1:1 correspondence to some or all of the new task inputs.

FIG. 1 includes two illustrative tasks, a first task ("Task A") 150 and a second task ("Task B") 152. A dependency edge 154 shows a relationship between the first task 150 and the second task 152. The first task 150, reads 1000 values from location "A" and writes the 1000 values to location "B." The second task 152, reads the first 500 values from location "B" and writes the values to location "C." As depicted in FIG. 1, a portion (i.e., the first 500 values read from location "A" and written to location "B") of the output from the first task 150 is used by the second task 152. The task manager circuitry 140, determines a 1:1 correspondence exists between a portion of the outputs provided by the first task 150 (i.e., the 500 values written to location "B") and the inputs used by the second task 152 (i.e., the 500 values read from location "B"). In response to detecting the 1:1 correspondence between a portion of the output from the first task 150 and the input to the second task 152, the task manager circuitry 140 further determines the first task 150 may be divided, apportioned, or allocated into two new subtasks $150_1$ and $150_2$.

New subtask $150_1$ includes the outputs from the first task 150 that have a 1:1 correspondence to the second task 152 inputs. The task manager circuitry 140 may group, indicate, or otherwise designate the dependency of new subtask $150_1$ and the second task 152 using one or more logical structures 156. New subtask $150_2$ includes the outputs from the first task 150 that do not share a correspondence with the second task 152 inputs. The task manager circuitry 140 may allocate or otherwise assign new subtask $150_1$ and the second task 152 to a single processor 110 or accelerator 112 to advantageously avoid the latency introduced by transmitting the output between devices. The task manager circuitry 140 may allocate or otherwise assign new subtask $150_2$ to a different processor 110 or accelerator 112 to beneficially execute new subtask $150_2$ in parallel with (i.e., contemporaneous or simultaneous with) the new subtask $150_1$.

In embodiments, the task manager circuitry 140 may be incorporated, in whole or in part, in one or more logic devices, elements, modules, or subsystems disposed external to the processor 110 and/or accelerators 112. In some implementations, the task manager circuitry 140 may include one or more dedicated circuits, modules, or subsystems within a host processor-based device. In at least some implementations, the task manager circuitry 140 includes one or more configurable circuits, logic devices, logic elements or combinations thereof that are autonomously configured using one or more machine readable instruction sets, logic sets, applications, or similar. Furthermore, although depicted in FIG. 1 as external to the processor 110, in some implementations, the processor 110, one or more cores 114, and/or the accelerators 112 may incorporate all or a portion of the task manager circuitry 140.

In embodiments, hypervisor circuitry or virtual machine manager (VMM) circuitry resident in a host machine may include all or a portion of the task manager circuitry 140. In such implementations, one or more guest or virtual machines in the host system may provide all or a portion of the processor 110, all or a portion of one or more cores 114, and/or all or a portion of the accelerators 112. In some implementations, the task manager circuitry may include or may have access to data indicative of a maximum task size and/or minimum task size (e.g., a defined number of bytes) for each of the existing subtasks $150_1$-$150_n$ and/or each of the new subtasks $152_1$-$152_n$.

One or more communication links 132 may communicably couple the task manager circuitry 140 with the processor 110 and/or accelerators 112. The one or more communications links 132 may include one or more serial or parallel bus structures. The one or more communications links 132 may include one or more short range or near field wireless communications interfaces. The one or more communications links 132 may include one or more traces or similar structures formed within a semiconductor package containing some or all of the processor 110 and/or accelerators 112.

The memory 120 may include any devices, systems, or combinations of systems and devices capable of storing, holding, or otherwise retaining data and/or information in a digital format. The memory 120 may include fixed or removable storage media. The memory 120 may include magnetic storage media, electromagnetic storage media, electroresistive storage media, optical storage media, molecular storage media, atomic storage media, quantum storage media, or combinations thereof.

As depicted in FIG. 1, the memory 120 retains the output data from existing tasks 150 and the input data received by new tasks 152. One or more communications links 122 communicably couples the memory 120 with some or all of the processor 110 and/or the accelerators 112. Within the memory 120 the arguments (e.g., the output) from existing tasks 150 may be stored in the form of a multi-dimensional array. For example, location "A" may include arguments arranged in an array 124 having one or more major axes 125 along which the multi-dimensional array is separable, apportionable, divisible, or otherwise partitionable and one or more minor axes 126 along which the multi-dimensional array is not cleanly separable, apportionable, divisible, or otherwise partitionable. Similarly, location "B" may include arguments arranged in an array 128 having one or more major axes 129 and one or more minor axes 130 and location "C" may include arguments arranged in an array 132 having one or more major axes 133 and one or more minor axes 133. In some implementations, the memory 120 may include data or information indicative of a minimum subtask size threshold. Such a minimum subtask size threshold may prevent the task manager circuitry from apportioning existing tasks 150 and/or new tasks 152 at too fine a level of granularity. Such a minimum subtask size threshold may include tasks that are 4 kilobytes (kB) or less; 8 kB or less; 16 kB or less; 128 kB or less; 256 kB or less; or 512 kB or less.

The processor 110 may include any device, system, and/or combination of systems and devices capable of executing machine readable instructions. Each processor 110 may include at least one core 114. In some implementations some or all of the processors 110 may include the same or different numbers of multiple cores $114_1$-$114_n$. In some implementations, the processor 110 may include any number of circuits containing any number of logic elements configured to provide one or more particular machines. In some implementations, the processor 110 may include, but are not limited to, one or more single core or multi-core microprocessors such as one or more Xeon® processors, one or more Celeron® processors, one or more Pentium® processors, one or more Itanium® processors, one or more Core™ i3, i5, or i7 processors (Intel® Corp., SANTA CLARA, Calif.). In some implementations, the processor 110 may include one or more digital signal processors (DSPs), one or more programmable gate arrays (PGAs), one or more application specific integrated circuits (ASICs), one or more reduced instruction set computing (RISC) processors, and similar.

Each of the accelerators 112 may include a dedicated or general purpose processor that includes any device, system, or combination of systems and devices capable of executing machine readable instructions. Each of the accelerators 112 may relieve the processor 110 of at least a portion of the computational load. Example accelerators 112 include, but are not limited to: one or more coprocessors, one or more graphical processing units (GPUs), one or more graphics media accelerators (GMAs), one or more cryptographic accelerators, one or more video processing units, one or more artificial intelligence accelerators, one or more digital signal processors, and one or more field programmable gate arrays (FPGAs). In some implementations, the accelerators 112 may include one or more Xeon Phi' coprocessors (Intel® Corp., SANTA CLARA, Calif.). In some implementations, the accelerators 112 may include one or more Intel HD Graphics, Intel Iris Graphics, or Intel Iris Pro Graphics (Intel® Corp., SANTA CLARA, Calif.), which are integrated graphics processors that may be disposed in, on, or about the same package or die as the processor 110. In some implementations, the processor 110 and some or all of the accelerators 112 may be disposed in whole or in part within a single semiconductor package, for example, a system-on-a-chip (SoC).

Figure 2:
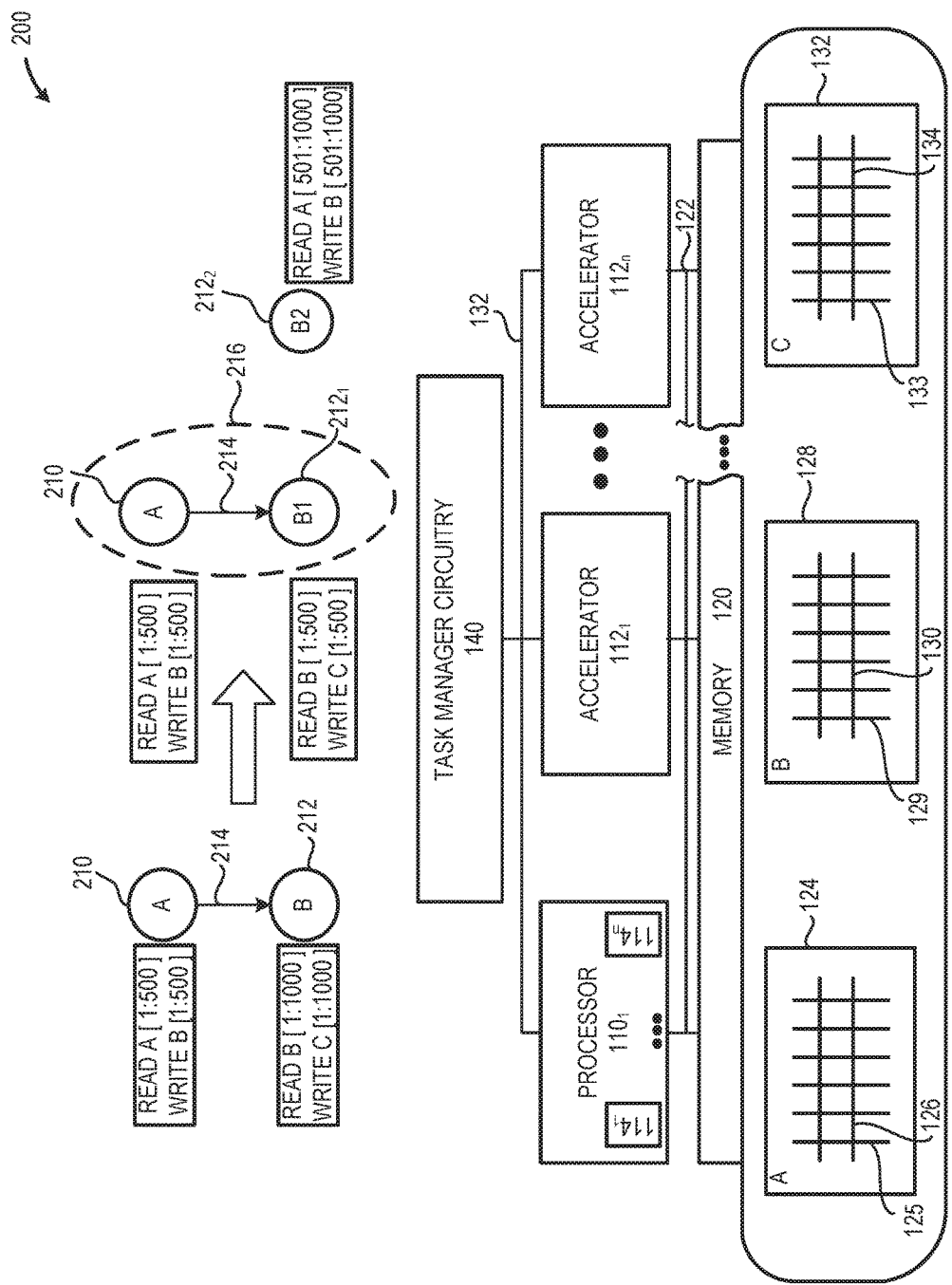
FIG. 2 is schematic diagram depicting an illustrative system in which a task management circuitry autonomously apportions a new task into a plurality of new subtasks such that a 1:1 correspondence exists between the output of an existing task and the input to a new subtask, in accordance with at least one embodiment described herein.

FIG. 2 depicts an illustrative system 200 in which a task management circuitry 140 autonomously apportions a second task 212 into a plurality of new subtasks $212_1$-$212_n$ (collectively, "new subtasks $212_x$") such that a 1:1 correspondence exists between the output of a first task 210 and the input to a new subtask 212, in accordance with at least one embodiment described herein. By apportioning the second task 212 into a plurality of new subtasks $212_x$, the task manager circuitry improves the functionality of applications executed on the system 200 by optimizing the usage of processing bandwidth by maximizing task parallelism, thereby providing greater system responsiveness through reduced operational latency. By optimizing task parallelism, system resources are conserved and available computational bandwidth is freed without the need for additional hardware.

The system 200 depicted in FIG. 2 includes two illustrative tasks, a first task "A" 210 and a second task "B" 212. A dependency edge 214 shows a relationship in which the second task 212 receives output from the first task 210. As depicted in FIG. 2, the first task 210, reads the first 500 values from location "A" and writes the first 500 values to location "B." The second task 212, reads the first 1000 values (i.e., values 1-500 and 501-1000) from location "B" and writes the first 1000 values to location "C." The output from the first task 210 (i.e., the first 500 values read from location "A" and written to location "B") is used as an input to the second task 212.

In operation, the task manager circuitry 140, detects or otherwise determines a 1:1 correspondence exists between the output provided by the first task 210 (i.e., write values 1-500 to location "B") and the inputs used by the second task 212 (i.e., read values 1-500 from location "B"). In response to detecting the 1:1 correspondence between a portion of the output from the first task 210 and the input to the second task 212, the task manager circuitry 140 further determines the second task 212 may be divided, apportioned, or allocated into new subtask $212_1$ and new subtask $212_2$.

New subtask $212_1$ receives the outputs from the first task 210 that have a 1:1 correspondence to the second task 212 inputs. The task manager circuitry 140 may group, indicate, or otherwise designate the relationship between the new subtask $212_1$ and the first task 210 using one or more logical structures 216 and/or one or more relational indicators (e.g., dependency edge 214).

The task manager circuitry 140 may allocate or otherwise assign the new subtask $212_1$ and the first task 210 to a single processor 110/processor core 114 or accelerator 112 to advantageously avoid introducing additional latency to the system 200 caused by transmitting or otherwise transferring some or all of the output between processors 110 and/or accelerators 112. The task manager circuitry 140 may allocate or otherwise assign the new subtask $212_2$ to a different processor/core 114 and/or accelerator 112 to beneficially execute the new subtask $212_2$ in parallel (i.e., contemporaneous or simultaneous) with new subtask $212_1$.

Figure 3:
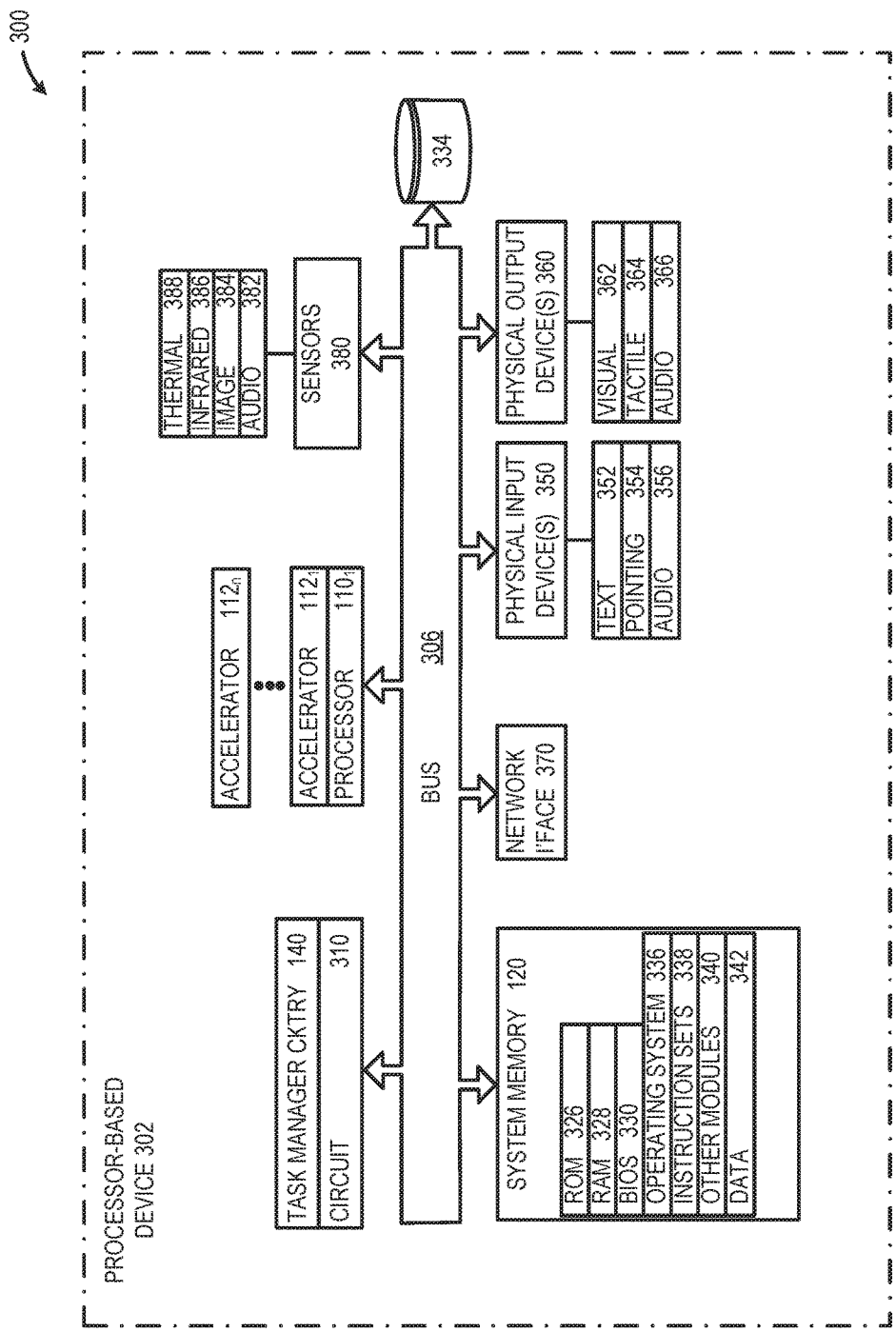
FIG. 3 is a block diagram depicting an illustrative processor-based device incorporating one or more logic devices, logic systems, logic elements, and/or circuits capable of providing task manager circuitry to apportion tasks among one or more processors/cores, and/or one or more accelerators to improve system performance by increasing task parallelism and reducing system latency attributable to data transfers between the one or more processors/cores and one or more accelerators, in accordance with at least one embodiment described herein.

FIG. 3 and the following discussion provide a brief, general description of the components forming an illustrative system 300 that includes a processor-based device 302 incorporating one or more logic devices, logic systems, logic elements, and/or circuits 310 capable of providing task manager circuitry 140 to apportion tasks among one or more processors 110/cores 114, and/or one or more accelerators 112 to improve system performance by increasing task parallelism and reducing system latency attributable to data transfers between the one or more processors 110/cores 114 and one or more accelerators 112, in accordance with at least one embodiment described herein.

At least some embodiments or implementations may include machine-readable or computer-executable instruction sets, such as program application modules, objects, or macros being executed by circuitry 310, one or more processors 110/cores 114, and/or one or more hardware accelerators 112. At least some embodiments or implementations may include circuitry implemented in the form of hard-wired circuitry and components, semiconductor circuitry, logic systems, logic elements, logic devices, logic modules, logic systems/sub-systems, microprocessors, controllers, or similar devices that provide the various components, systems, sub-systems, or modules included in the processor-based device 302.

Those skilled in the relevant art will appreciate the illustrated embodiments as well as other embodiments may be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The processor-based device 302 may include any number of circuits 310, each of which may include a variety of electronic and/or semiconductor components that are disposed at least partially within a wearable computer, portable computing device, personal digital assistant, personal computer, blade server, workstation, rack mount blade server, or other similar current or future processor-based devices and/or systems capable of executing machine-readable instructions. The one or more circuits 310 may be interconnected with, electrically coupled, and/or communicably coupled to various components within the processor-based device 302 via one or more serial or parallel conductors, pathways, or buses 306. As depicted in FIG. 3, all or a portion of the one or more circuits 310 may be apportioned or allocated to providing, forming, or otherwise producing all or a portion of the task manager circuitry 140.

As depicted in FIG. 3, system components such as the system memory 120 may be communicably coupled to the one or more circuits 310 via the bus 306. The processor-based device 302 may, at times, be referred to in the singular herein, but this is not intended to limit the embodiments to a single system, since in certain embodiments, there will be more than one processor-based device 302, networked processor based devices 302, client/server processor-based devices 302, or other networked systems, circuits, or devices included.

The one or more circuits 310 may include any number, type, or combination of conductors, insulators, electrical devices, and/or semiconductor components. At times, the one or more circuits 310 may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 3 are of conventional design. As a result, such blocks need not be described in further detail herein, as they will be understood by those skilled in the relevant art. The bus 306 that interconnects at least some of the components may employ any known serial or parallel bus structures or architectures.

The system memory 120 may include read-only memory ("ROM") 326 and random access memory ("RAM") 328 in any number, capacity, and/or configuration. A portion of the ROM 326 may contain a basic input/output system ("BIOS") 330. The BIOS 330 may provide basic functionality to the processor-based device 302. For example, by causing, in some implementations, the one or more circuits 310 to load one or more machine-readable instruction sets that cause the all or a portion of the one or more circuits 310 to provide and function as the task manager circuitry 140.

The processor-based device 302 may include one or more communicably coupled, non-transitory, data storage devices 334. The one or more data storage devices 334 may include any number and/or combination of any current or future developed non-transitory storage devices and/or memory. Non-limiting examples of such non-transitory, data storage devices 334 may include, but are not limited to, one or more magnetic storage devices, one or more optical storage devices, one or more solid-state electromagnetic storage devices, one or more electroresistive storage devices, one or more molecular storage devices, one or more quantum storage devices, or various combinations thereof. In some implementations, the data storage devices 334 may be disposed remote from the processor-based device 302. In some implementations, the data storage devices 334 may include one or more hot-pluggable or removable data storage devices.

One or more interfaces and/or controllers (not shown in FIG. 3) may communicably couple the one or more storage devices 334 to the bus 306. The one or more storage devices 334 may contain machine-readable instruction sets, data structures, program modules, and other data useful to the task manager circuitry 140. For example, the one or more storage devices 334 may include information and/or data indicative of the maximum task size and/or minimum task size for a new subtask or an existing subtask The processor-based device 302 may include any number or combination of sensors 380 capable of detecting internal, external, and/or environmental conditions and/or events. In some implementations, such sensors 380 may include any number and/or combination of one or more of the following: audio input sensors 382 (e.g., one or more microphones or similar); image sensors 384 (e.g., one or more charge coupled device (CCD) or complementary metal oxide semiconductor (CMOS) image sensors, ambient light level sensors, or similar); infrared illuminators/infrared image acquisition sensors 386; one or more thermal sensors 388 (e.g., thermocouples, resistive thermal devices, non-contact thermal sensors, or similar). In at least some implementations, such sensors 380 may autonomously collect information and/or data on a continuous or intermittent basis at regular, irregular, periodic, or aperiodic intervals.

In some implementations, the task manager circuitry 140 may receive sensor data provided by one or more sensors 380 and may use such data in allocating tasks and/or subtasks among the processors 110/cores 114, and/or accelerators 112. For example, the task manager circuitry 140 may allocate tasks and/or subtasks among the processors 110/cores 114 and/or accelerators 112 based at least in part on a sensed temperature or similar thermal parameter of the respective processor 110/core 114, and/or accelerator 112.

Machine-readable instruction sets and/or applications 338 may be stored or otherwise retained in whole or in part in the storage device 334 or in whole or in part, in system memory 120. Such instruction sets may be transferred from one or more storage devices 334 and stored in the system memory 120 in whole or in part for execution by the one or more circuits 310. The machine-readable instruction sets 338 may include instructions and/or logic providing the semantic labeling functions and capabilities described herein. For example, one or more applications 338 may cause the circuitry 310 to provide task manager circuitry 140 as described above in FIGS. 1 and 2.

The processor-based device 302 may include one or more communicably coupled physical input devices 350, such as one or more text entry devices 352 (e.g., keyboard), one or more pointing devices 354 (e.g., mouse, trackball, touchscreen), and/or one or more audio input devices 356. Such physical input devices 350 may be used, for example, to provide, enter, or otherwise supply commands (e.g., acknowledgements, selections, confirmations, and similar) as well as information (e.g., acknowledgements, and similar) to the processor-based device 302. The processor-based device 302 may include one or more communicably coupled physical output devices 360, such as one or more visual output devices 362 (e.g., a display device), one or more tactile output devices 364 (e.g., haptic feedback or similar), one or more audio output devices 366, or combinations thereof.

The processor-based device 302 may include one or more network interfaces 370 to provide communications capabilities with one or more additional processor-based devices. In some implementations, the one or more network interfaces 370 may include one or more lands disposed in, on, or about one or more external edges of a processor-based device 302 such as a rack mounted blade server. In some implementations, the one or more network interfaces 370 may include one or more wireless interfaces, such as one or more IEEE 802.11 (Wi-Fi®) compliant interfaces. In some implementations, the one or more network interfaces 370 may include one or more wired interfaces, such as one or more IEEE 802.3 ("Ethernet") compliant interfaces.

For convenience, the network interface 370, the one or more circuits 310, the system memory 324, the physical input devices 350 and the physical output devices 360 are illustrated as communicatively coupled to each other via the bus 306, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In some embodiments, the bus 306 may be omitted and the components are coupled directly to each other using suitable wired or wireless connections.

Figure 4:
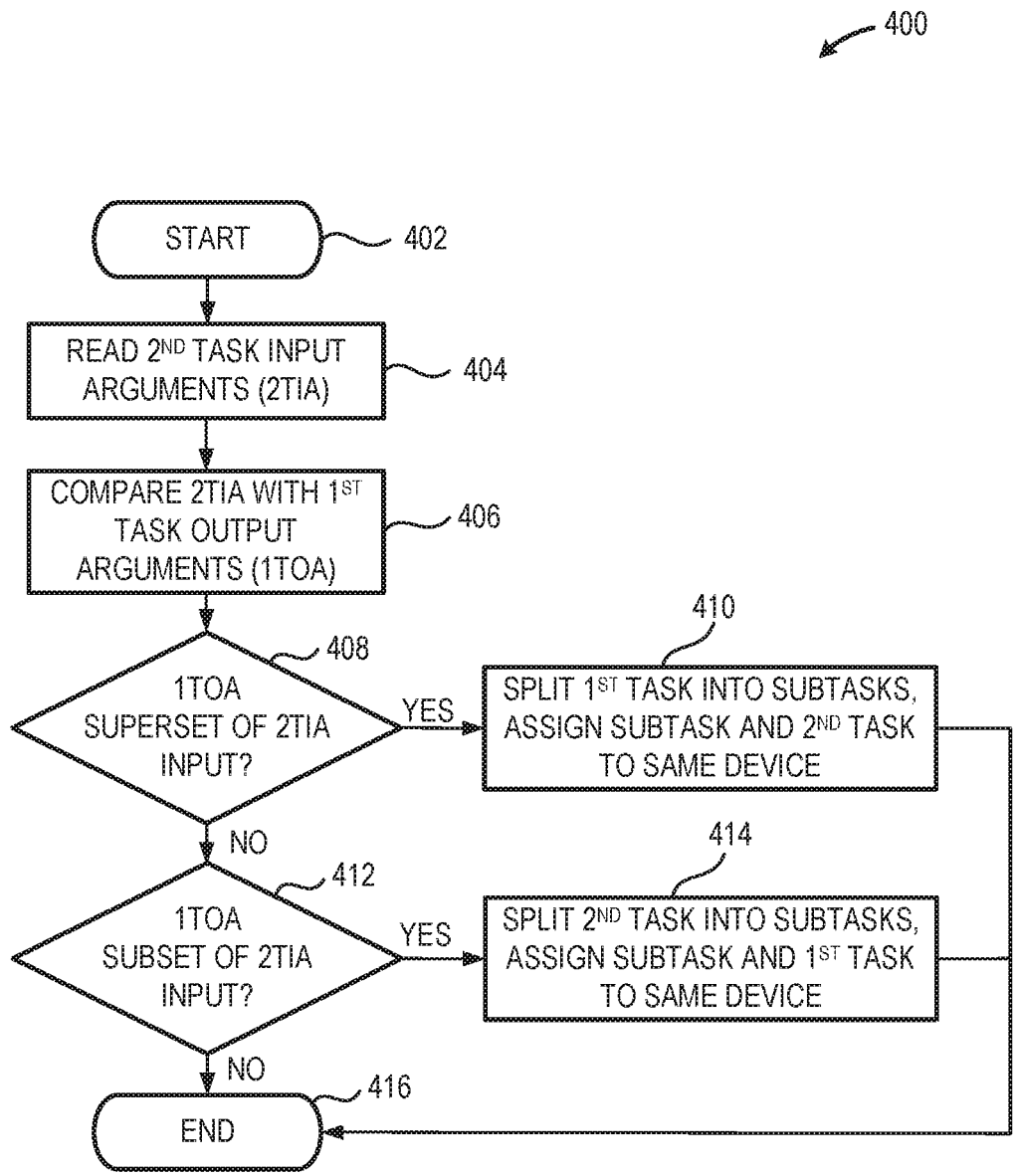
FIG. 4 is a high-level flow diagram of an illustrative method for apportioning a task into subtasks such that the input/output of one subtask maintains a 1:1 correspondence with the input/output of another task, in accordance with at least one embodiment described herein.

FIG. 4 provides a high-level flow diagram of an illustrative method 400 for apportioning a task into subtasks such that the input/output of one subtask maintains a 1:1 correspondence with the input/output of another task, in accordance with at least one embodiment described herein. The task manager circuitry 140 compares the output of one or more first (e.g., existing) tasks 150 with the input of one or more second (e.g., new or existing) tasks 152 to detect whether the task output of the first task 150 represents at least one of a subset or superset of (i.e., has a 1:1 correspondence to all or a portion of) the task input to the second task 152. Where the output of the first task 150 represents a superset of the input to the second task 152 (i.e., the output arguments of the first task 150 include at least all input arguments of the second task 152), the task manager circuitry 140 may apportion or otherwise divide the first task 150 into a plurality of subtasks $150_1$-$150_n$, at least one of which includes output having a 1:1 correspondence to the input of the second task 152. Where the output of the first task 150 includes a subset of the input to the second task 152 (i.e., the output arguments of the first task 150 include at least a portion of the input arguments of the second task 152), the task manager circuitry 140 may apportion or otherwise divide the second task 152 into a plurality of subtasks $152_1$-$152_n$, at least one of which includes input having a 1:1 correspondence to the output of the first task 150. The method 400 commences at 402.

At 404, the task manager circuitry 140 reads some or all of the arguments associated with the second task 152. In at least some implementations, the arguments associated with the second task 152 may include some or all of the inputs to the second task 152. In some implementations, the task manager 140 may store as an array 124 in system memory 120 some or all of the arguments associated with the second task 152. In some implementations, the array 124 may include one or more major axes 125 and one or more minor axes 126.

At 406, the task manager circuitry 140 compares the second task input arguments (abbreviated "2TIA" in FIG. 4) to the first task output arguments (abbreviated "1TOA" in FIG. 4) to detect whether a 1:1 correspondence exists between all or a portion of the second task input arguments and one or more first task output arguments.

At 408, if the task manager circuitry 140 determines the first task output arguments include or represents a superset of the second task input arguments (e.g., the inputs to the second task 152 represent a subset of the outputs of an first task 150) the method 400 proceeds to 410, otherwise the method 400 proceeds to 412.

At 410, the task manager circuitry 140 apportions, splits, or divides the first task 150 into a plurality of new subtasks $150_1$-$150_n$. The task manager circuitry 140 apportions the first task 150 such that the output of one of the new subtasks $150_x$ has a 1:1 correspondence with the inputs to the second task 152. In some implementations, the task manager circuitry 140 assigns the new subtask $150_x$ and the second task 152 to a common device, such as a common processor 110/core 114 or accelerator 112. Assigning the new subtask $150_x$ and the second task 152 to a common device beneficially eliminates the latency introduced by transferring the output of the new subtask 150x from a first processor 110/core 114 or accelerator 112 to a second task 152 executing on a second processor 110/core 114 or accelerator 112. After the task manager circuitry 140 apportions, splits, or divides the first task 150 into a plurality of new subtasks $150_1$-$150_n$ at 410, the method 400 concludes at 416.

At 412, if the task manager circuitry 140 determines the first task arguments includes or represents a subset of the second task arguments (e.g., the outputs of the first task 150 are or represent a subset of the inputs to the second task 152) the method 400 proceeds to 414, otherwise the method 400 concludes at 416.

At 414, the task manager circuitry 140 apportions, splits, or divides the second task 152 into a plurality of new subtasks $152_1$-$152_n$. The task manager circuitry 140 apportions the second task 152 such that the input arguments to one of the new subtasks $152_x$ has a 1:1 correspondence with the output arguments from the first task 150. In some implementations, the task manager circuitry 140 assigns the new subtask $152_x$ and the first task 150 to a common device, such as a common processor 110/core 114 or accelerator 112. Assigning the new subtask $152_x$ and the first task 150 to a common device beneficially eliminates the latency introduced by transferring the output of the first task 150 from a first processor 110/core 114 or accelerator 112 to the new subtask $152_x$ executing on a second processor 110/core 114 or accelerator 112. After the task manager circuitry 140 apportions, splits, or divides the second task 152 into a plurality of new subtasks $152_1$-$152_n$ at 414, the method concludes at 416.

Figure 5:
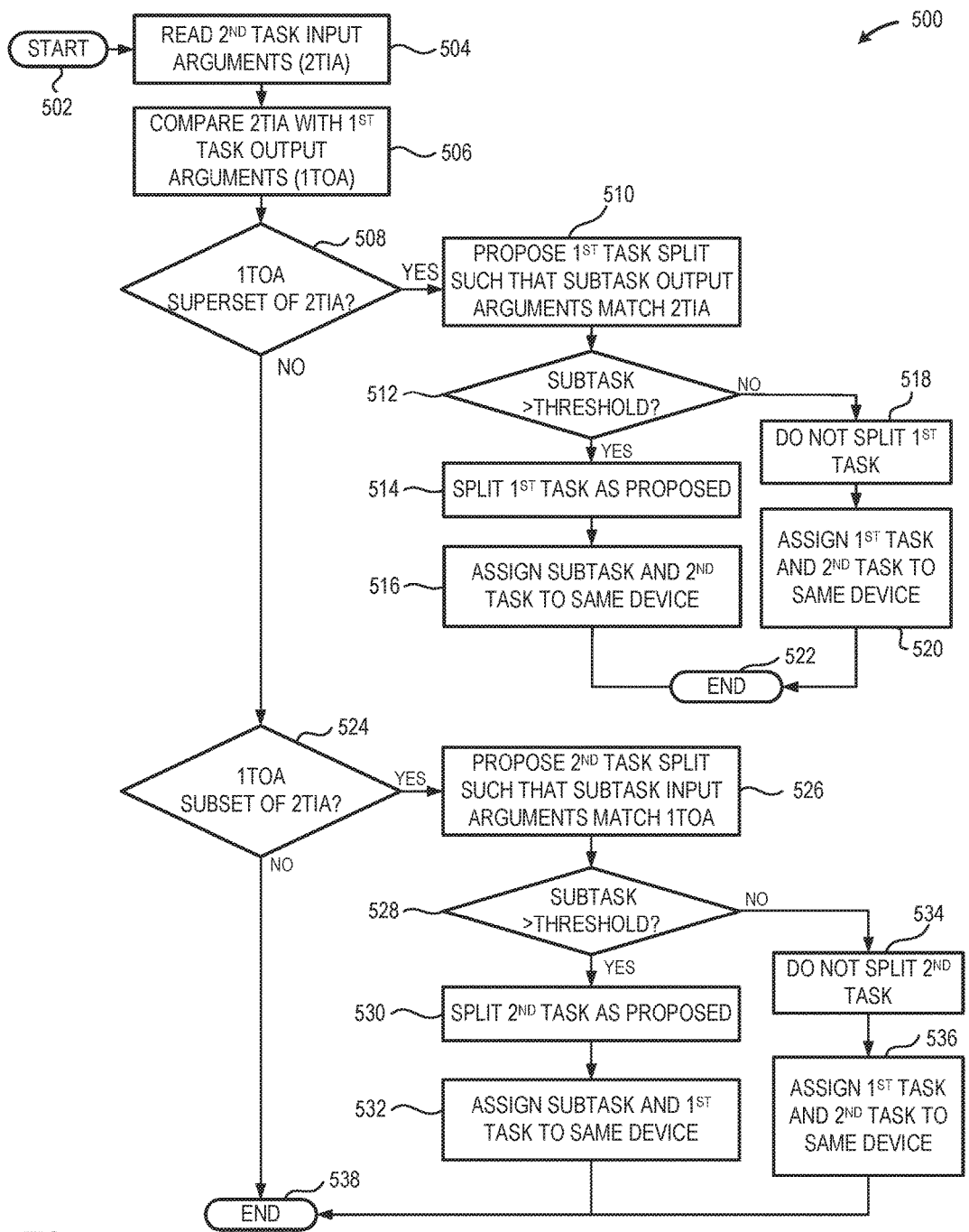
FIG. 5 is a high-level flow diagram of an illustrative method for apportioning a task into subtasks such that the input/output of one subtask maintains a 1:1 correspondence with the input/output of another task, in accordance with at least one embodiment described herein.

FIG. 5 provides a high-level flow diagram of an illustrative method 500 for apportioning a task into subtasks such that the input/output of one subtask maintains a 1:1 correspondence with or relationship to the input/output of another task, in accordance with at least one embodiment described herein. The task manager circuitry 140 compares the output of one or more first tasks 150 with the input of one or more second tasks 152 to detect whether the first task output arguments include a subset or superset of (i.e., the first task output arguments have a 1:1 correspondence to all or a portion of) the second task input arguments.

Where the output arguments of the first task 150 include or form a superset to the input arguments to the second task 152, the task manager circuitry 140 may propose an apportionment or division of the first task 150 into a plurality of new subtasks $150_1$-$150_n$, at least one of which includes output arguments having a 1:1 correspondence to the input arguments of the second task 152. In some implementations, the task manager circuitry may determine whether the size of some or all of the plurality of new subtasks $150_1$-$150_n$, are greater than a defined threshold value. If the size of some or all of the plurality of new subtasks $150_1$-$150_n$, is greater than a defined threshold value, the task manager circuitry 140 may apportion the first task 150 into the proposed plurality of new subtasks $150_1$-$150_n$. If the size of some or all of the plurality of new subtasks $150_1$-$150_n$, is less than the defined threshold value, the task manager circuitry 140 may reject the apportionment or division of the first task 150.

Where the output arguments of the first task 150 include or form a subset to the input arguments to the second task 152, the task manager circuitry 140 may apportion or otherwise divide the second task 152 into a plurality of new subtasks $152_1$-$152_n$, at least one of which includes input arguments having a 1:1 correspondence to the output arguments of the first task 150. In some implementations, the task manager circuitry may determine whether the size of some or all of the plurality of new subtasks $152_1$-$152_n$, are greater than a defined threshold value. If the size of some or all of the plurality of new subtasks $152_1$-$152_n$, is greater than a defined threshold value, the task manager circuitry 140 may apportion the second task 152 into the proposed plurality of new subtasks $152_1$-$152_n$. If the size of some or all of the plurality of new subtasks $152_1$-$152_n$, is less than the defined threshold value, the task manager circuitry 140 may reject the apportionment or division of the second task 152. The method 500 commences at 502.

At 504, the task manager circuitry 140 reads some or all of the input arguments associated with a second task 152. In some implementations, the task manager 140 may store as an array 124 in system memory 120 some or all of the input arguments associated with the second task 152. In some implementations, the array 124 may include one or more major axes 125 and one or more minor axes 126.

At 506, the task manager circuitry 140 compares the second task input arguments to one or more first task output arguments to detect whether a 1:1 correspondence exists between all or a portion of the second task input arguments and one or more first task output arguments.

At 508, if the task manager circuitry 140 determines the first task arguments form, represent or include a superset of the second task input arguments (e.g., the input arguments to the second task 152 form, represent, or include a subset of the output arguments of the first task 150) the method 500 proceeds to 510, otherwise the method 500 proceeds to 524.

At 510, the task manager circuitry 140 proposes an apportionment, split, or division of the first task 150 into a plurality of new subtasks $150_1$-$150_n$. The task manager circuitry 140 proposes the apportionment, split, or division of the first task 150 such that the output arguments associated with one of the new subtasks $150_x$ provides a 1:1 correspondence with the input arguments associated with the second task 152.

At 512, the task manager circuitry 140 determines whether the size of new subtask $150_x$ is greater than or equal to a defined threshold value. The threshold value may be empirically determined based upon measured or theoretical processor 110/core 114 or accelerator 112 performance (e.g., the defined threshold value may be established as the minimum size beneath which improvement in system performance is minimized or beneath which the time required to locate and retrieve the existing subtask exceeds a defined number of processor or accelerator clock cycles or time). In some implementations, the defined threshold value may be a fixed value determined by the physical parameters and/or configuration of the respective processor 110/core 114 or accelerator 112. In some implementations, the defined threshold value may be a variable value determined by the task manager circuitry 140 based upon one or more operational parameters such as memory utilization, processor/core utilization, accelerator utilization, or combinations thereof.

If the task manager circuitry 140 determines the size of new subtask $150_x$ is greater than or equal to the defined threshold value, the method 500 continues at 514. If the task manager circuitry 140 determines the size of new subtask $150_x$ is less than the defined threshold value, the method 500 continues at 518.

At 514, responsive to determining the size of some or all of the new subtasks $150_1$-$150_n$ is greater than or equal to the defined threshold value, the task manager circuitry 140 apportions, splits, or divides the first task 150 to form the new subtasks $150_1$-$150_n$ proposed at 510.

At 516, the task manager circuitry 140 assigns the new subtask $150_x$ and the second task 152 to a common device, such as a common processor 110/core 114 or accelerator 112. Assigning the new subtask $150_x$ and the second task 152 to a common device beneficially eliminates the latency introduced by transferring the output arguments of the new subtask 150x from a first processor 110/core 114 or accelerator 112 to a second task 152 executing on a second processor 110/core 114 or accelerator 112. The method 500 then concludes at 522.

At 518, responsive to determining the size of some or all of the new subtasks $150_1$-$150_n$ is less than the defined threshold value, the task manager circuitry 140 rejects the apportionment, splitting, or division of the first task 150 into the new subtasks $150_1$-$150_n$ proposed at 510 and allows the first task 150 to remain intact or undivided.

At 520, the task manager circuitry 140 assigns the undivided first task 150 and the second task 152 to a common device, such as a common processor 110/core 114 or accelerator 112. Assigning the undivided first task 150 and the second task 152 to a common device beneficially eliminates the latency introduced by transferring the output arguments of the undivided first task 150 from a first processor 110/core 114 or accelerator 112 to a second task 152 executing on a second processor 110/core 114 or accelerator 112. The method 500 then concludes at 522.

At 524, if the task manager circuitry 140 determines the first task output arguments form or otherwise include a subset of the second task input arguments (e.g., the input arguments to the second task 152 form a superset of the output arguments of the first task 150) the method 500 proceeds to 526, otherwise the method 500 concludes at 538.

At 526, the task manager circuitry 140 proposes an apportionment, split, or division of the second task 152 into a plurality of new subtasks $152_1$-$152_n$. The task manager circuitry 140 proposes the apportionment, split, or division of the second task 152 such that the input arguments associated with a new subtask $152_x$ share a 1:1 correspondence with the output arguments associated with the first task 150.

At 528, the task manager circuitry 140 determines whether the size of the new subtask $152_x$ is greater than or equal to a defined threshold value. The threshold value may be empirically determined based upon measured or theoretical processor 110/core 114 or accelerator 112 performance (e.g., the defined threshold value may be established as the minimum size beneath which improvement in system performance is minimized or beneath which the time required to locate and retrieve the existing subtask exceeds a defined number of processor or accelerator clock cycles or time). In some implementations, the defined threshold value may be a fixed value determined by the physical parameters and/or configuration of the respective processor 110/core 114 or accelerator 112. In some implementations, the defined threshold value may be a variable value determined by the task manager circuitry 140 based upon one or more operational parameters such as memory utilization, processor/core utilization, accelerator utilization, or combinations thereof.

If the task manager circuitry 140 determines the size of the new subtask $152_x$ is greater than or equal to the defined threshold value, the method 500 continues at 530. If the task manager circuitry 140 determines the size of the new subtask $152_x$ is less than the defined threshold value, the method 500 continues at 534.

At 530, responsive to determining the size of the new subtask $152_x$ is greater than or equal to the defined threshold value, the task manager circuitry 140 apportions, splits, or divides the new task 152 into the new subtasks $152_1$-$152_n$ proposed at 526.

At 532, the task manager circuitry 140 assigns the first task 150 and the new subtask $152_x$ to a common device, such as a common processor 110/core 114 or accelerator 112. Assigning the first task 150 and the new subtask $152_x$ to a common device beneficially eliminates the latency introduced by transferring the output arguments associated with the first task 150 from a first processor 110/core 114 or accelerator 112 to a second processor 110/core 114 or accelerator 112 on which the new subtask $152_x$ executes. Subsequent to 532, the method 500 concludes at 538.

At 534, responsive to determining the size of the new subtask $152_x$ is less than the defined threshold value, the task manager circuitry 140 rejects the apportionment, splitting, or division of the second task 152 into the new subtasks $152_1$-$152_n$ proposed at 526 and allows the second task 152 to remain undivided.

At 536, the task manager circuitry 140 assigns the first task 150 and the undivided second task 152 to a common device, such as a common processor 110/core 114 or accelerator 112. Assigning the first task 150 and the undivided second task 152 to a common device beneficially eliminates the latency introduced by transferring the output arguments associated with the first task 150 from a first processor 110/core 114 or accelerator 112 to a second processor 110/core 114 or accelerator 112 on which the undivided second task 152 executes. Subsequent to 536, the method 500 concludes at 538.

Figure 6A:
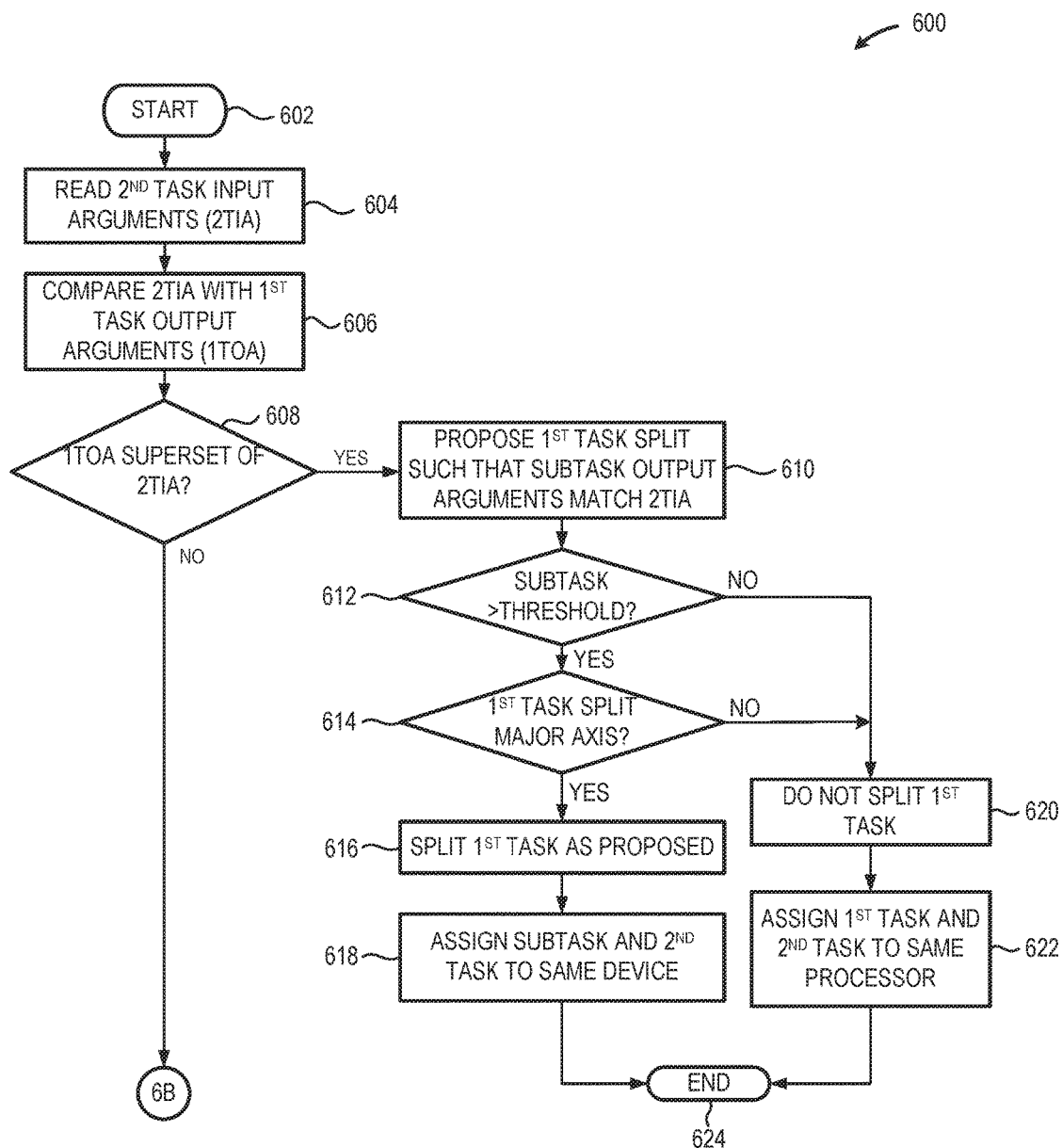
FIG. 6A is a high-level flow diagram of an illustrative method for apportioning a task into subtasks such that the input/output of one subtask maintains a 1:1 correspondence with the input/output of another task, in accordance with at least one embodiment described herein.
Figure 6B:
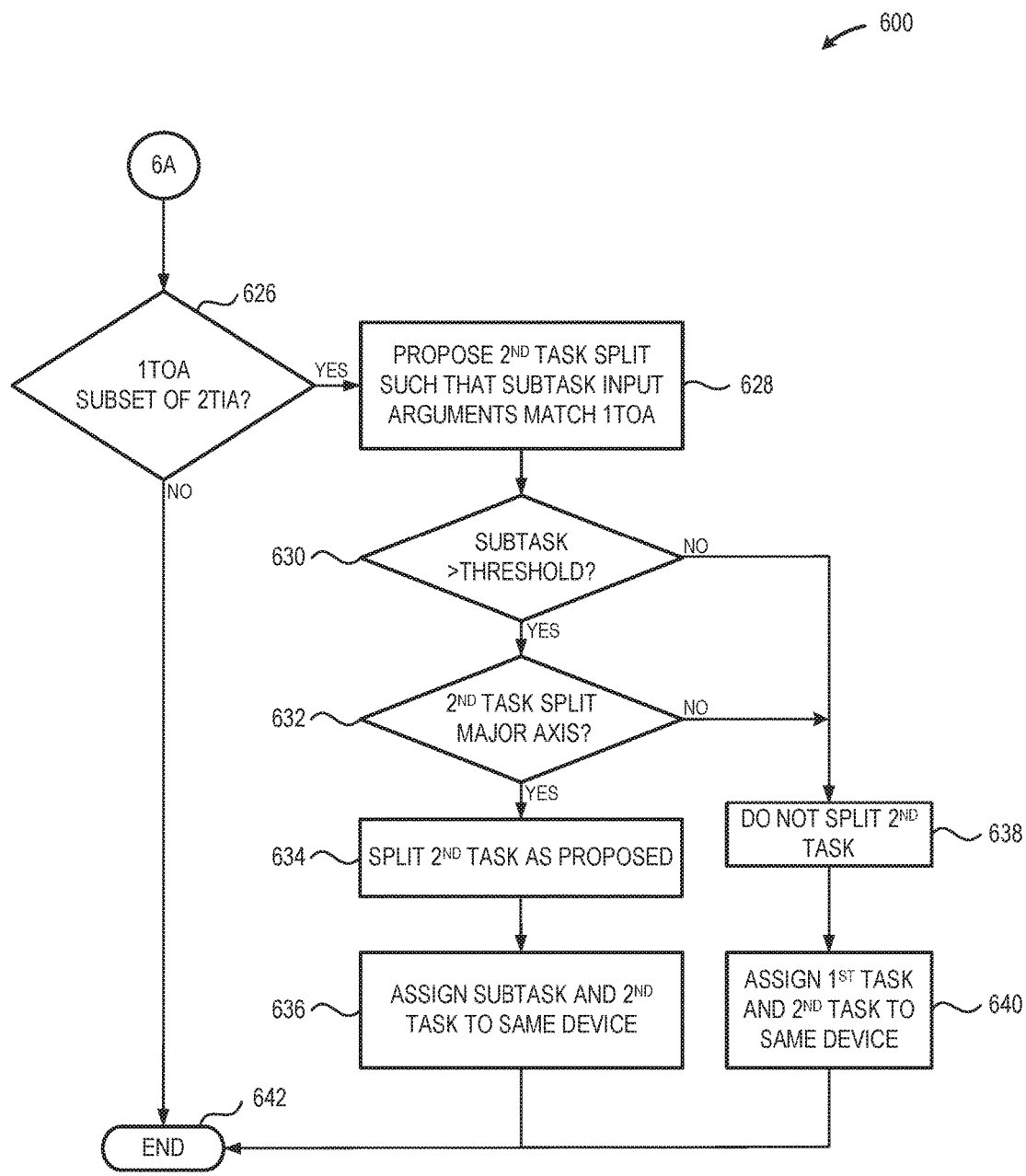
FIG. 6B is a high-level flow diagram that continues the illustrative method for apportioning a task into subtasks that commences in FIG. 6A, in accordance with at least one embodiment described herein.

FIG. 6A provides a high-level flow diagram of an illustrative method 600 for apportioning a task into a plurality of new subtasks such that the input/output arguments associated with of one of the new subtasks maintains or forms a 1:1 correspondence with the input/output arguments associated with another task, in accordance with at least one embodiment described herein. FIG. 6B provides a continuation of the high-level flow diagram of the illustrative method 600 depicted in FIG. 6A, the method 600 including apportioning a task into a plurality of new subtasks such that the input/output arguments associated with of one of the new subtasks maintains or forms a 1:1 correspondence with the input/output arguments associated with another task, in accordance with at least one embodiment described herein. The task manager circuitry 140 compares the output arguments associated with each of one or more first tasks 150 with the input arguments associated with each of one or more second tasks 152 to detect whether the output arguments associated with a first task include a subset or superset of (i.e., has a 1:1 correspondence to all or a portion of) the input arguments associated with a second task.

Where the output arguments associated with the first task 150 include or form a superset of the input arguments associated with the second task 152, the task manager circuitry 140 may propose an apportionment or division of the first task 150 into a plurality of new subtasks $150_1$-$150_n$, at least one of which includes output arguments having a 1:1 correspondence to the input arguments associated with the second task 152. In some implementations, the task manager circuitry may determine whether the size of some or all of the plurality of new subtasks $150_1$-$150_n$, exceed a defined threshold value. If the size of some or all of the plurality of new subtasks $150_1$-$150_n$, exceed a defined threshold value, the task manager circuitry 140 may determine whether the first task 150 is apportionable, splittable, or divisible along a major axis 125 to form the new subtasks $150_1$-$150_n$. If the task manager circuitry 140 determines the first task 150 is apportionable, splittable, or divisible along a major axis 125 and the size of some or all of the new subtasks $150_1$-$150_n$ meet or exceed the defined threshold value, the task manager circuitry 140 may apportion the first task 150 into the proposed plurality of new subtasks $150_1$-$150_n$. If the size of some or all of the plurality of new subtasks $150_1$-$150_n$, is less than the defined threshold value, or if the first task 150 is not divisible along a major axis 125 to form the new subtasks $150_1$-$150_n$ the task manager circuitry 140 may reject the apportionment or division of the first task 150, thereby allowing the first task 150 to remain undivided.

Where the output arguments associated with the first task 150 includes a subset of the input arguments associated with the second task 152, the task manager circuitry 140 may apportion or otherwise divide the second task 152 into a plurality of new subtasks $152_1$-$152_n$, at least one of which ($152_x$) includes input arguments having a 1:1 correspondence to the output arguments of the first task 150. In some implementations, the task manager circuitry may determine whether the size of the new subtask $152_x$, exceeds a defined threshold value. If the size of the new subtasks $152_x$, exceeds a defined threshold value, the task manager circuitry 140 may determine whether the second task 152 is apportionable, splittable, or divisible along a major axis 125 to provide or otherwise form the existing subtasks $152_1$-$152_n$. If the task manager circuitry 140 determines the second task 152 is apportionable, splittable, or divisible along a major axis 125 and the size of the new subtask $152_x$ exceeds the defined threshold value, the task manager circuitry 140 may apportion the second task 152 into the proposed plurality of new subtasks $152_1$-$152_n$. If the size of the new subtask $152_x$, is less than the defined threshold value, or if the second task 152 is not divisible along a major axis 125 to form the plurality of new subtasks $152_1$-$152_n$ the task manager circuitry 140 may reject the apportionment or division of the second task 152. The method 600 commences at 602.

At 604, the task manager circuitry 140 reads some or all of the arguments associated with a second task 152. In at least some implementations, the arguments associated with the second task 152 may include some or all of the input arguments associated with the second task 152. In some implementations, the task manager 140 may store some or all of the input arguments associated with the second task 152 as an array 124 in system memory 120. In some implementations, the array 124 may include one or more major axes 125 and one or more minor axes 126.

At 606, the task manager circuitry 140 compares the second task input arguments to one or more first task output arguments to detect or determine whether a 1:1 correspondence exists between all or a portion of the second task input arguments and one or more first task output arguments.

At 608, if the task manager circuitry 140 determines the first task output arguments include or form a superset of the second task input arguments (e.g., the input arguments associated with the second task 152 form a subset of the output arguments associated with the first task 150) the method 600 proceeds to 610, otherwise the method 600 proceeds to 626.

At 610, the task manager circuitry 140 proposes an apportionment, split, or division of the first task 150 into a plurality of new subtasks $150_1$-$150_n$. The task manager circuitry 140 proposes the apportionment, split, or division of the first task 150 such that the output arguments associated with one of the new subtasks ($150_x$) form or otherwise provide a 1:1 correspondence with the input arguments associated with the second task 152.

At 612, the task manager circuitry 140 determines whether the size of the new subtask $150_x$ meets or exceeds a defined threshold value. The threshold value may be empirically determined based upon measured or theoretical processor 110/core 114 or accelerator 112 performance (e.g., the defined threshold value may be established as the minimum size beneath which improvement in system performance is minimized or beneath which the time required to locate and retrieve the existing subtask exceeds a defined number of processor or accelerator clock cycles or time). In some implementations, the defined threshold value may be a fixed value determined by the physical parameters and/or configuration of the respective processor 110/core 114 or accelerator 112. In some implementations, the defined threshold value may be a variable value determined by the task manager circuitry 140 based upon one or more operational parameters such as memory utilization, processor/core utilization, accelerator utilization, or combinations thereof.

If, at 612, the task manager circuitry 140 determines the size of the new subtask $150_x$ meets or exceeds the defined threshold value, the method 600 continues at 614. If, at 612, the task manager circuitry 140 determines the size of the new subtask $150_x$ is less than the defined threshold value, the method 600 continues at 620.

At 614, the task manager circuitry 140 determines whether the output arguments associated with the first task 150 are apportionable, splittable, or divisible along a major axis 125 to form the new subtasks $150_1$-$150_n$ proposed at 610. If the task manager circuitry 140 determines the output arguments associated with the first task 150 are apportionable, splittable, or divisible along a major axis 125 to form at the new subtasks $150_1$-$150_n$ proposed at 610, the method 600 continues at 616. If the task manager circuitry determines the output arguments associated with the first task 150 are not divisible along a major axis 125 to form the new subtasks $150_1$-$150_n$ proposed at 610, the method 600 continues at 620.

At 616, responsive to the task manager circuitry 140 determining the size of the existing subtask $150_x$ meets or exceeds the defined threshold value and the output arguments associated with the first task 150 are apportionable, splittable, or divisible along a major axis 125 to provide the new subtasks $150_1$-$150_n$ proposed at 610, the task manager circuitry 140 apportions, splits, or divides the first task 150 into the plurality of new subtasks $150_1$-$150_n$ proposed at 610.

At 618, the task manager circuitry 140 assigns the new subtask $150_x$ and the second task 152 to a common device, such as a common processor 110/core 114 or accelerator 112. Assigning the new subtask $150_x$ and the second task 152 to a common device beneficially eliminates the latency introduced by transferring the output arguments of the new subtask $150_x$ from a first processor 110/core 114 or accelerator 112 to a second processor 110/core 114 or accelerator 112 on which the second task 152 executes. Subsequent to 618, the method 600 concludes at 624.

At 620, responsive to the task manager circuitry 140 determining either (or both) the size of the existing subtask $150_x$ is less than the defined threshold value or the output arguments associated with the first task 150 are not apportionable, splittable, or divisible along a major axis 125 to provide the new subtasks $150_1$-$150_n$ proposed at 610, the task manager circuitry 140 may reject the apportionment or division of the first task 150, thereby allowing the first task 150 to remain undivided.

At 622, the task manager circuitry 140 assigns the undivided first task 150 and the second task 152 to a common device, such as a common processor 110/core 114 or accelerator 112. Assigning the undivided first task 150 and the second task 152 to a common device beneficially eliminates the latency introduced by transferring the output arguments associated with the undivided first task 150 from a first processor 110/core 114 or accelerator 112 to a second processor 110/core 114 or accelerator 112 on which the second task 152 executes. Subsequent to 622, the method 600 concludes at 624.

At 626, if the task manager circuitry 140 determines the first task output arguments include or form a subset of the second task input arguments (e.g., the input arguments associated with the second task 152 form a superset of the output arguments associated with the first task 150) the method 600 proceeds to 628, otherwise the method 600 concludes at 642.

At 628, the task manager circuitry 140 proposes an apportionment, split, or division of the second task 152 into a plurality of new subtasks $152_1$-$152_n$. The task manager circuitry 140 proposes the apportionment, split, or division of the second task 152 such that the input arguments associated with at least one new subtask ($152_x$) share or form a 1:1 correspondence with the output arguments associated with at least one first task 150.

At 630, the task manager circuitry 140 determines whether the size of the new subtask $152_x$ meets or exceeds a defined threshold value. The threshold value may be empirically determined based upon measured or theoretical processor 110/core 114 or accelerator 112 performance (e.g., the defined threshold value may be established as the minimum size beneath which improvement in system performance is minimized or beneath which the time required to locate and retrieve the existing subtask exceeds a defined number of processor or accelerator clock cycles or time). In some implementations, the defined threshold value may be a fixed value determined by the physical parameters and/or configuration of the respective processor 110/core 114 or accelerator 112. In some implementations, the defined threshold value may be a variable value determined by the task manager circuitry 140 based upon one or more operational parameters such as memory utilization, processor/core utilization, accelerator utilization, or combinations thereof.

If the task manager circuitry 140 determines the size of the new subtask $152_x$ meets or exceeds the defined threshold value, the method 600 continues at 632. If the task manager circuitry 140 determines the size of the new subtask $152_x$ is less than the defined threshold value, the method 600 continues at 638.

At 632, the task manager circuitry 140 determines whether the input arguments associated with the second task 152 are apportionable, splittable, or divisible along a major axis 125 to form the new subtasks $152_1$-$152_n$ proposed at 628. If the task manager circuitry 140 determines the input arguments associated with the second task 152 are apportionable, splittable, or divisible along a major axis 125 to form at least some of the new subtasks $152_1$-$152_n$ proposed at 628, the method 600 continues at 634. If the task manager circuitry 140 determines the input arguments associated with the second task 152 are not divisible along a major axis 125 to form at least some of the new subtasks $152_1$-$152_n$ proposed at 628, the method 600 continues at 638.

At 634, responsive to determining the size of the new subtask $152_x$ meets or exceeds the defined threshold value, the task manager circuitry 140 apportions, splits, or divides the second task 152 into the new subtasks $152_1$-$152_n$ proposed at 628.

At 636, the task manager circuitry 140 assigns the new subtask $152_x$ and the first task 150 to a common device, such as a common processor 110/core 114 or accelerator 112. Assigning the first task 150 and the new subtask $152_x$ to a common device beneficially eliminates the latency introduced by transferring the output arguments associated with the first task 150 from a first processor 110/core 114 or accelerator 112 to a second processor 110/core 114 or accelerator 112 on which the new subtask $152_x$ executes. Subsequent to 636, the method 600 concludes at 642.

At 638, responsive to determining the size of the new subtask $152_x$ is less than the defined threshold value or that the input arguments associated with the second task 152 are not apportionable, splittable, or divisible along a major axis 125 to provide the new subtasks $152_1$-$152_n$ proposed at 628, the task manager circuitry 140 rejects the apportionment, splitting, or division of the second task 152 into the new subtasks $152_1$-$152_n$ and allows the second task 152 to remain undivided.

At 640, the task manager circuitry 140 assigns the first task 150 and the undivided second task 152 to a common device, such as a common processor 110/core 114 or accelerator 112. Assigning the first task 150 and the undivided second task 152 to a common device beneficially eliminates the latency introduced by transferring the output arguments associated with the first task 150 from a first processor 110/core 114 or accelerator 112 to a second processor 110/core 114 or accelerator 112 on which the undivided second task 152 executes. Subsequent to 640, the method 600 concludes at 642.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to example 1, there is provided a system that may include: a plurality of communicably coupled processors; a system memory communicably coupled to the plurality of communicably coupled processors; and task manager circuitry that dynamically allocates tasks among the plurality of communicably coupled processors, the task manager circuitry to: compare a plurality of output arguments associated with a first task with a plurality of input arguments associated with a second task; determine whether a 1:1 correspondence exists between at least some of the plurality of output arguments associated with the first task and at least some of the plurality of input arguments associated with the second task; and responsive to determining at least some of the plurality of output arguments associated with the first task have a 1:1 correspondence with the plurality of input arguments associated with the second task: apportion the first task into a plurality of new first task subtasks, such that each of the output arguments associated with a new first task subtask has a 1:1 correspondence with each of the plurality of input arguments associated with the second task.

Example 2 may include elements of example 1 and the task manager circuitry may further: responsive to determining the plurality of output arguments associated with the first task have a 1:1 correspondence with at least some of the plurality of input arguments associated with the second task: apportion the second task into a plurality of new second task subtasks, such that each of the input arguments associated with a new second task subtask has a 1:1 correspondence with each of the plurality of output arguments associated with the first task.

Example 3 may include elements of example 2 and the task manager circuitry may further: responsive to apportioning the first task into a plurality of new first task subtasks, such that each of the output arguments associated with a new first task subtask has a 1:1 correspondence with each of the plurality of input arguments associated with the second task: determine whether at least one parameter associated with the new first task subtask is greater than or equal to at least one defined threshold value.

Example 4 may include elements of example 3 and the task manager circuitry may further, responsive to determining the at least one parameter associated with the new first task subtask is not greater than or equal to the at least one defined threshold value, schedule execution of the first task and the second task on a common one of the plurality of processors.

Example 5 may include elements of example 3 and the task manager circuitry may further, responsive to determining the at least one parameter associated with the new first task subtask is greater than or equal to the at least one defined threshold value, determine whether the plurality of output arguments associated with the first task is separable along a major axis in system memory.

Example 6 may include elements of example 5 and the task manager circuitry may further, responsive to determining the plurality of output arguments associated with the first task are separable along a major axis in system memory, schedule execution of the new first task subtask and the second task on a common one of the plurality of processors.

Example 7 may include elements of example 6 and the task manager circuitry may further, responsive to determining the plurality of output arguments associated with the first task are not separable along a major axis in system memory, schedule execution of the first task and the second task on a common one of the plurality of processors.

Example 8 may include elements of example 2 and the task manager circuitry may further, responsive to apportioning the second task into the plurality of new second task subtasks, such that each of the input arguments associated with a new second task subtask has a 1:1 correspondence with each of the plurality of output arguments associated with the first task, determine whether at least one parameter associated with the new second task subtask is greater than or equal to at least one defined threshold value.

Example 9 may include elements of example 8 and the task manager circuitry may further, responsive to determining the at least one parameter associated with the new second task subtask is not greater than or equal to at least one defined threshold value, schedule execution of the first task and the second task on a common one of the plurality of processors.

Example 10 may include elements of example 8 and the task manager circuitry may further, responsive to determining the at least one parameter associated with the new second task subtask is greater than or equal to at least one defined threshold value, determine whether the plurality of input arguments associated with the second task is separable along a major axis in system memory.

Example 11 may include elements of example 10 and the task manager circuitry may further, responsive to determining the plurality of input arguments associated with the second task are separable in system memory along the major axis, schedule execution of the first task and the new second task subtask on a common one of the plurality of processors.

Example 12 may include elements of example 10 and the task manager circuitry may further, responsive to determining the input arguments associated with the second task are not separable in system memory along the major axis, schedule execution of the first task and the second task on a common one of the plurality of processors.

According to example 13, there is provided a method of dynamically allocating tasks among a plurality of communicably coupled processors. The method may include comparing, by a task manager, a plurality of output arguments associated with a first task with a plurality of input arguments associated with a second task; determining, by the task manager, whether a 1:1 correspondence exists between at least some of the plurality of output arguments associated with the first task and at least some of the plurality of input arguments associated with the second task; and responsive to determining at least some of the plurality of output arguments associated with the first task have a 1:1 correspondence with the plurality of input arguments associated with the second task: apportioning, by the task manager, the first task into a plurality of new first task subtasks, such that each of the output arguments associated with a new first task subtask has a 1:1 correspondence with each of the plurality of input arguments associated with the second task.

Example 14 may include elements of example 13 and the method may additionally include, responsive to determining the plurality of output arguments associated with the first task have a 1:1 correspondence with at least some of the plurality of input arguments associated with the second task, apportioning, by the task manager, the second task into a plurality of new second task subtasks, such that each of the input arguments associated with a new second task subtask has a 1:1 correspondence with each of the plurality of output arguments associated with the first task.

Example 15 may include elements of example 14 and the method may additionally include, responsive to apportioning the first task into a plurality of new first task subtasks, such that each of the output arguments associated with a new first task subtask has a 1:1 correspondence with each of the plurality of input arguments associated with the second task, determining, by the task manager, whether at least one parameter associated with the new first task subtask is greater than or equal to at least one defined threshold value.

Example 16 may include elements of example 15 and the method may additionally include, responsive to determining the at least one parameter associated with the new first task subtask is not greater than or equal to the at least one defined threshold value, scheduling execution of the first task and the second task on a common one of the plurality of processors.

Example 17 may include elements of example 15 and the method may additionally include, responsive to determining the at least one parameter associated with the new first task subtask is greater than or equal to the at least one defined threshold value, determining whether the plurality of output arguments associated with the first task is separable along a major axis in system memory.

Example 18 may include elements of example 17 and the method may additionally include, responsive to determining whether the plurality of output arguments associated with the first task is separable along a major axis in system memory, scheduling execution of the new first task subtask and the second task on a common one of the plurality of processors.

Example 19 may include elements of example 17 and the method may additionally include, responsive to determining whether the plurality of output arguments associated with the first task is not separable along a major axis in system memory, scheduling execution of the first task and the second task on a common one of the plurality of processors.

Example 20 may include elements of example 14 and the method may additionally include, responsive to apportioning, by the task manager, the second task into a plurality of new second task subtasks, such that each of the input arguments associated with a new second task subtask has a 1:1 correspondence with each of the plurality of output arguments associated with the first task, determining whether at least one parameter associated with the new second task subtask is greater than or equal to at least one defined threshold value.

Example 21 may include elements of example 20 and the method may additionally include, responsive to determining the at least one parameter associated with the new second task subtask is not greater than or equal to at least one defined threshold value, scheduling execution of the first task and the second task on a common one of the plurality of processors.

Example 22 may include elements of example 20 and the method may additionally include, responsive to determining the at least one parameter associated with the new second task subtask is greater than or equal to at least one defined threshold value, determining whether the plurality of input arguments associated with the second task is separable along a major axis in system memory.

Example 23 may include elements of example 22 and the method may additionally include, responsive to determining the plurality of input arguments associated with the second task is separable along a major axis in system memory, scheduling execution of the first task and the new second task subtask on a common one of the plurality of processors.

Example 24 may include elements of example 22 and the method may additionally include, responsive to determining the plurality of input arguments associated with the second task is not separable along a major axis in system memory, scheduling execution of the first task and the second task on a common one of the plurality of processors.

According to example 25, there is provided a device including task manager circuitry that dynamically allocates tasks among the plurality of communicably coupled processors. Thee task manager circuitry may: compare a plurality of output arguments associated with a first task with a plurality of input arguments associated with a second task; determine whether a 1:1 correspondence exists between at least some of the plurality of output arguments associated with the first task and at least some of the plurality of input arguments associated with the second task; and, responsive to determining at least some of the plurality of output arguments associated with the first task have a 1:1 correspondence with the plurality of input arguments associated with the second task, apportion the first task into a plurality of new first task subtasks, such that each of the output arguments associated with a new first task subtask has a 1:1 correspondence with each of the plurality of input arguments associated with the second task; and, responsive to determining the plurality of output arguments associated with the first task have a 1:1 correspondence with at least some of the plurality of input arguments associated with the second task, apportion the second task into a plurality of new second task subtasks, such that each of the input arguments associated with a new second task subtask has a 1:1 correspondence with each of the plurality of output arguments associated with the first task.

Example 26 may include elements of example 25 and the task manager circuitry may further, responsive to apportioning the first task into a plurality of new first task subtasks, such that each of the output arguments associated with a new first task subtask has a 1:1 correspondence with each of the plurality of input arguments associated with the second task, determine whether at least one parameter associated with the new first task subtask is greater than or equal to at least one defined threshold value.

Example 27 may include elements of example 26 and the task manager circuitry may further, responsive to determining the at least one parameter associated with the new first task subtask is not greater than or equal to the at least one defined threshold value, schedule execution of the first task and the second task on a common one of the plurality of processors.

Example 28 may include elements of example 26 and the task manager circuitry may further, responsive to determining the at least one parameter associated with the new first task subtask is greater than or equal to the at least one defined threshold value, determine whether the plurality of output arguments associated with the first task is separable along a major axis in system memory.

Example 29 may include elements of example 28 and the task manager circuitry may further, responsive to determining the plurality of output arguments associated with the first task are separable along a major axis in system memory, schedule execution of the new first task subtask and the second task on a common one of the plurality of processors.

Example 30 may include elements of example 28 and the task manager circuitry may further, responsive to determining the plurality of output arguments associated with the first task are not separable along a major axis in system memory, schedule execution of the first task and the second task on a common one of the plurality of processors.

Example 31 may include elements of example 25 and the task manager circuitry may further, responsive to apportioning the second task into the plurality of new second task subtasks, such that each of the input arguments associated with a new second task subtask has a 1:1 correspondence with each of the plurality of output arguments associated with the first task, determine whether at least one parameter associated with the new second task subtask is greater than or equal to at least one defined threshold value.

Example 32 may include elements of example 31 and the task manager circuitry may further, responsive to determining the at least one parameter associated with the new second task subtask is not greater than or equal to at least one defined threshold value, schedule execution of the first task and the second task on a common one of the plurality of processors.

Example 33 may include elements of example 32 and the task manager circuitry may further, responsive to determining the at least one parameter associated with the new second task subtask is greater than or equal to at least one defined threshold value, determine whether the plurality of input arguments associated with the second task is separable along a major axis in system memory.

Example 34 may include elements of example 33 and the task manager circuitry may further, responsive to determining the plurality of input arguments associated with the second task are separable in system memory along the major axis, schedule execution of the first task and the new second task subtask on a common one of the plurality of processors.

Example 35 may include elements of example 34 and the task manager circuitry may further, responsive to determining the input arguments associated with the second task are not separable in system memory along the major axis, schedule execution of the first task and the second task on a common one of the plurality of processors.

According to example 36, there is provided a system for dynamically allocating tasks among a plurality of communicably coupled processors. The system may include: a means for comparing a plurality of output arguments associated with a first task with a plurality of input arguments associated with a second task; a means for determining whether a 1:1 correspondence exists between at least some of the plurality of output arguments associated with the first task and at least some of the plurality of input arguments associated with the second task; and, responsive to determining at least some of the plurality of output arguments associated with the first task have a 1:1 correspondence with the plurality of input arguments associated with the second task, a means for apportioning the first task into a plurality of new first task subtasks, such that each of the output arguments associated with a new first task subtask has a 1:1 correspondence with each of the plurality of input arguments associated with the second task.

Example 37 may include elements of example 36 and the system may additionally include, responsive to determining the plurality of output arguments associated with the first task have a 1:1 correspondence with at least some of the plurality of input arguments associated with the second task, a means for apportioning the second task into a plurality of new second task subtasks, such that each of the input arguments associated with a new second task subtask has a 1:1 correspondence with each of the plurality of output arguments associated with the first task.

Example 38 may include elements of example 37 and the system may additionally include, responsive to apportioning the first task into a plurality of new first task subtasks, such that each of the output arguments associated with a new first task subtask has a 1:1 correspondence with each of the plurality of input arguments associated with the second task, a means for determining, whether at least one parameter associated with the new first task subtask is greater than or equal to at least one defined threshold value.

Example 39 may include elements of example 38 and the system may additionally include, responsive to determining the at least one parameter associated with the new first task subtask is not greater than or equal to the at least one defined threshold value, a means for scheduling execution of the first task and the second task on a common one of the plurality of processors.

Example 40 may include elements of example 38 and the system may additionally include, responsive to determining the at least one parameter associated with the new first task subtask is greater than or equal to the at least one defined threshold value, a means for determining whether the plurality of output arguments associated with the first task is separable along a major axis in system memory.

Example 41 may include elements of example 40 and the system may additionally include, responsive to determining whether the plurality of output arguments associated with the first task is separable along a major axis in system memory, a means for scheduling execution of the new first task subtask and the second task on a common one of the plurality of processors.

Example 42 may include elements of example 40 and the system may additionally include, responsive to determining whether the plurality of output arguments associated with the first task is not separable along a major axis in system memory, a means for scheduling execution of the first task and the second task on a common one of the plurality of processors.

Example 43 may include elements of example 37 and the system may additionally include, responsive to apportioning, by the task manager, the second task into a plurality of new second task subtasks, such that each of the input arguments associated with a new second task subtask has a 1:1 correspondence with each of the plurality of output arguments associated with the first task, a means for determining whether at least one parameter associated with the new second task subtask is greater than or equal to at least one defined threshold value.

Example 44 may include elements of example 43 and the system may additionally include, responsive to determining the at least one parameter associated with the new second task subtask is not greater than or equal to at least one defined threshold value, a means for scheduling execution of the first task and the second task on a common one of the plurality of processors.

Example 45 may include elements of example 43 and the system may additionally include, responsive to determining the at least one parameter associated with the new second task subtask is greater than or equal to at least one defined threshold value, a means for determining whether the plurality of input arguments associated with the second task is separable along a major axis in system memory.

Example 46 may include elements of example 45 and the system may additionally include, responsive to determining the plurality of input arguments associated with the second task is separable along a major axis in system memory, a means for scheduling execution of the first task and the new second task subtask on a common one of the plurality of processors.

Example 47 may include elements of example 43 and the system may additionally include, responsive to determining the plurality of input arguments associated with the second task is not separable along a major axis in system memory, a means for scheduling execution of the first task and the second task on a common one of the plurality of processors.

According to example 48, there is provided a non-transitory computer readable medium that includes instructions that when executed by a circuit transform the circuit to dedicated task manager circuitry. The task manager circuitry may: compare a plurality of output arguments associated with a first task with a plurality of input arguments associated with a second task; determine whether a 1:1 correspondence exists between at least some of the plurality of output arguments associated with the first task and at least some of the plurality of input arguments associated with the second task; and responsive to determining at least some of the plurality of output arguments associated with the first task have a 1:1 correspondence with the plurality of input arguments associated with the second task, apportion the first task into a plurality of new first task subtasks, such that each of the output arguments associated with a new first task subtask has a 1:1 correspondence with each of the plurality of input arguments associated with the second task.

Example 49 may include elements of example 48 where the instructions may further cause the task manager circuitry to, responsive to determining the plurality of output arguments associated with the first task have a 1:1 correspondence with at least some of the plurality of input arguments associated with the second task, apportion the second task into a plurality of new second task subtasks, such that each of the input arguments associated with a new second task subtask has a 1:1 correspondence with each of the plurality of output arguments associated with the first task.

Example 50 may include elements of example 48 where the instructions may further cause the task manager circuitry to, responsive to apportioning the first task into a plurality of new first task subtasks, such that each of the output arguments associated with a new first task subtask has a 1:1 correspondence with each of the plurality of input arguments associated with the second task, determine whether at least one parameter associated with the new first task subtask is greater than or equal to at least one defined threshold value.

Example 51 may include elements of example 50 where the instructions may further cause the task manager circuitry to, responsive to determining the at least one parameter associated with the new first task subtask is not greater than or equal to the at least one defined threshold value, schedule execution of the first task and the second task on a common one of the plurality of processors.

Example 52 may include elements of example 50 where the instructions may further cause the task manager circuitry to, responsive to determining the at least one parameter associated with the new first task subtask is greater than or equal to the at least one defined threshold value, determine whether the plurality of output arguments associated with the first task is separable along a major axis in system memory.

Example 53 may include elements of example 52 where the instructions may further cause the task manager circuitry to, responsive to determining the plurality of output arguments associated with the first task are separable along a major axis in system memory, schedule execution of the new first task subtask and the second task on a common one of the plurality of processors.

Example 54 may include elements of example 52 where the instructions may further cause the task manager circuitry to, responsive to determining the plurality of output arguments associated with the first task are not separable along a major axis in system memory, schedule execution of the first task and the second task on a common one of the plurality of processors.

Example 55 may include elements of example 49 where the instructions may further cause the task manager circuitry to, responsive to apportioning the second task into the plurality of new second task subtasks, such that each of the input arguments associated with a new second task subtask has a 1:1 correspondence with each of the plurality of output arguments associated with the first task, determine whether at least one parameter associated with the new second task subtask is greater than or equal to at least one defined threshold value.

Example 56 may include elements of example 55 where the instructions may further cause the task manager circuitry to, responsive to determining the at least one parameter associated with the new second task subtask is not greater than or equal to at least one defined threshold value, schedule execution of the first task and the second task on a common one of the plurality of processors.

Example 57 may include elements of example 55 where the instructions may further cause the task manager circuitry to, responsive to determining the at least one parameter associated with the new second task subtask is greater than or equal to at least one defined threshold value, determine whether the plurality of input arguments associated with the second task is separable along a major axis in system memory.

Example 58 may include elements of example 57 where the instructions may further cause the task manager circuitry to, responsive to determining the plurality of input arguments associated with the second task are separable in system memory along the major axis, schedule execution of the first task and the new second task subtask on a common one of the plurality of processors.

Example 59 may include elements of example 55 where the instructions may further cause the task manager circuitry to, responsive to determining the input arguments associated with the second task are not separable in system memory along the major axis, schedule execution of the first task and the second task on a common one of the plurality of processors.

According to example 60, there is provided a system for dynamically allocating tasks among a plurality of communicably coupled processors, the system being arranged to perform the method of any of examples 13 through 24.

According to example 61, there is provided a chipset arranged to perform the method of any of examples 13 through 24.

According to example 62, there is provided a non-transitory machine readable medium comprising a plurality of instructions that, in response to be being executed on a computing device, cause the computing device to carry out the method according to any of examples 13 through 24.

According to example 63, there is provided a device configured for dynamically allocating tasks among a plurality of communicably coupled processors, the device being arranged to perform the method of any of examples 13 through 24.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. A system comprising:
a plurality of communicably coupled processors;
a system memory communicably coupled to the plurality of communicably coupled processors; and
task manager circuitry that dynamically allocates tasks among the plurality of communicably coupled processors, the task manager circuitry to:
compare a plurality of output arguments associated with a first task with a plurality of input arguments associated with a second task;
determine whether a 1:1 correspondence exists between at least some of the plurality of output arguments associated with the first task and at least some of the plurality of input arguments associated with the second task; and
responsive to determining at least some of the plurality of output arguments associated with the first task have a 1:1 correspondence with the plurality of input arguments associated with the second task:
apportion the first task into a plurality of new first task subtasks, such that each of the output arguments associated with a new first task subtask has a 1:1 correspondence with each of the plurality of input arguments associated with the second task.

2. The system of claim 1, the task manager circuitry to further:
responsive to determining the plurality of output arguments associated with the first task have a 1:1 correspondence with at least some of the plurality of input arguments associated with the second task:
apportion the second task into a plurality of new second task subtasks, such that each of the input arguments associated with a new second task subtask has a 1:1 correspondence with each of the plurality of output arguments associated with the first task.

3. The system of claim 2, the task manager circuitry to further:
responsive to apportioning the first task into a plurality of new first task subtasks, such that each of the output arguments associated with a new first task subtask has a 1:1 correspondence with each of the plurality of input arguments associated with the second task:
determine whether at least one parameter associated with the new first task subtask is greater than or equal to at least one defined threshold value.

4. The system of claim 3, the task manager circuitry to further:
responsive to determining the at least one parameter associated with the new first task subtask is not greater than or equal to the at least one defined threshold value:
schedule execution of the first task and the second task on a common one of the plurality of processors.

5. The system of claim 3, the task manager circuitry to further:
responsive to determining the at least one parameter associated with the new first task subtask is greater than or equal to the at least one defined threshold value:
determine whether the plurality of output arguments associated with the first task is separable along a major axis in system memory.

6. The system of claim 5, the task manager circuitry to further:
responsive to determining the plurality of output arguments associated with the first task are separable along a major axis in system memory:
schedule execution of the new first task subtask and the second task on a common one of the plurality of processors.

7. The system of claim 5, the task manager circuitry to further:
responsive to determining the plurality of output arguments associated with the first task are not separable along a major axis in system memory:
schedule execution of the first task and the second task on a common one of the plurality of processors.

8. The system of claim 2, the task manager circuitry to further:
responsive to apportioning the second task into the plurality of new second task subtasks, such that each of the input arguments associated with a new second task subtask has a 1:1 correspondence with each of the plurality of output arguments associated with the first task:
determine whether at least one parameter associated with the new second task subtask is greater than or equal to at least one defined threshold value.

9. The system of claim 8, the task manager circuitry to further:
responsive to determining the at least one parameter associated with the new second task subtask is not greater than or equal to at least one defined threshold value:
schedule execution of the first task and the second task on a common one of the plurality of processors.

10. The system of claim 8, the task manager circuitry to further:
responsive to determining the at least one parameter associated with the new second task subtask is greater than or equal to at least one defined threshold value:
determine whether the plurality of input arguments associated with the second task is separable along a major axis in system memory.

11. The system of claim 10, the task manager circuitry to further:
responsive to determining the plurality of input arguments associated with the second task are separable in system memory along the major axis:
schedule execution of the first task and the new second task subtask on a common one of the plurality of processors.

12. The system of claim 10, the task manager circuitry to further:
responsive to determining the input arguments associated with the second task are not separable in system memory along the major axis:
schedule execution of the first task and the second task on a common one of the plurality of processors.

13. A method of dynamically allocating tasks among a plurality of communicably coupled processors, the method comprising:
comparing, by a task manager, a plurality of output arguments associated with a first task with a plurality of input arguments associated with a second task;
determining, by the task manager, whether a 1:1 correspondence exists between at least some of the plurality of output arguments associated with the first task and at least some of the plurality of input arguments associated with the second task; and
responsive to determining at least some of the plurality of output arguments associated with the first task have a 1:1 correspondence with the plurality of input arguments associated with the second task:
apportioning, by the task manager, the first task into a plurality of new first task subtasks, such that each of the output arguments associated with a new first task subtask has a 1:1 correspondence with each of the plurality of input arguments associated with the second task.

14. The method of claim 13, further comprising:
responsive to determining the plurality of output arguments associated with the first task have a 1:1 correspondence with at least some of the plurality of input arguments associated with the second task:
apportioning, by the task manager, the second task into a plurality of new second task subtasks, such that each of the input arguments associated with a new second task subtask has a 1:1 correspondence with each of the plurality of output arguments associated with the first task.

15. The method of claim 14, further comprising:
responsive to apportioning the first task into a plurality of new first task subtasks, such that each of the output arguments associated with a new first task subtask has a 1:1 correspondence with each of the plurality of input arguments associated with the second task:
determining, by the task manager, whether at least one parameter associated with the new first task subtask is greater than or equal to at least one defined threshold value.

16. The method of claim 15, further comprising:
responsive to determining the at least one parameter associated with the new first task subtask is not greater than or equal to the at least one defined threshold value:
scheduling execution of the first task and the second task on a common one of the plurality of processors.

17. The method of claim 15, further comprising:
responsive to determining the at least one parameter associated with the new first task subtask is greater than or equal to the at least one defined threshold value:

determining whether the plurality of output arguments associated with the first task is separable along a major axis in system memory.

18. The method of claim 17, further comprising:
responsive to determining whether the plurality of output arguments associated with the first task is separable along a major axis in system memory:
scheduling execution of the new first task subtask and the second task on a common one of the plurality of processors.

19. The method of claim 17, further comprising:
responsive to determining whether the plurality of output arguments associated with the first task is not separable along a major axis in system memory:
scheduling execution of the first task and the second task on a common one of the plurality of processors.

20. The method of claim 14, further comprising:
responsive to apportioning, by the task manager, the second task into a plurality of new second task subtasks, such that each of the input arguments associated with a new second task subtask has a 1:1 correspondence with each of the plurality of output arguments associated with the first task:
determining whether at least one parameter associated with the new second task subtask is greater than or equal to at least one defined threshold value.

21. The method of claim 20, further comprising:
responsive to determining the at least one parameter associated with the new second task subtask is not greater than or equal to at least one defined threshold value:
scheduling execution of the first task and the second task on a common one of the plurality of processors.

22. The method of claim 20, further comprising:
responsive to determining the at least one parameter associated with the new second task subtask is greater than or equal to at least one defined threshold value:
determining whether the plurality of input arguments associated with the second task is separable along a major axis in system memory.

23. The method of claim 22, further comprising
responsive to determining the plurality of input arguments associated with the second task is separable along a major axis in system memory:
scheduling execution of the first task and the new second task subtask on a common one of the plurality of processors.

24. The method of claim 22, further comprising:
responsive to determining the plurality of input arguments associated with the second task is not separable along a major axis in system memory:
scheduling execution of the first task and the second task on a common one of the plurality of processors.

* * * * *